(12) United States Patent
Jeuk et al.

(10) Patent No.: US 11,398,948 B2
(45) Date of Patent: Jul. 26, 2022

(54) GENERATION AND DEPLOYMENT OF INHERITED NETWORK TOPOLOGY MODELS

(71) Applicant: Cisco Technology, Inc., San Jose, CA (US)

(72) Inventors: Sebastian Jeuk, Munich (DE); Sridar Kandaswamy, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 75 days.

(21) Appl. No.: 16/915,706

(22) Filed: Jun. 29, 2020

(65) Prior Publication Data
US 2021/0409277 A1 Dec. 30, 2021

(51) Int. Cl.
*H04L 12/24* (2006.01)
*H04W 84/18* (2009.01)
(Continued)

(52) U.S. Cl.
CPC ...... *H04L 41/0813* (2013.01); *H04L 41/0846* (2013.01); *H04L 41/12* (2013.01); *H04L 41/14* (2013.01)

(58) Field of Classification Search
CPC . H04L 41/0813; H04L 41/0846; H04L 41/12; H04L 41/14
See application file for complete search history.

(56) References Cited

U.S. PATENT DOCUMENTS 7,373,394 B1 * 5/2008 Li .................. H04L 67/327
709/227
7,986,639 B1 * 7/2011 Sadagopan ............. H04L 12/66
709/224

(Continued)

FOREIGN PATENT DOCUMENTS

| CN | 102868733 | 1/2013 |
| CN | 107819662 | 3/2018 |

OTHER PUBLICATIONS

Antonescu, Alexandru et al., "Dynamic Topology Orchestration for Distributed Cloud-Based Applications", Dec. 2012, pp. 1-9.

(Continued)

*Primary Examiner* — Christopher B Robinson
(74) *Attorney, Agent, or Firm* — Lee & Hayes, P.C.

(57) ABSTRACT

A deployment system may generate and deploy network topology models within one or more workload resource domains. In some examples, the deployment system may implement a hierarchical data structure to store and manage multiple variations of a network topology models, in which network topology definitions and other characteristics may be inherited between related elements in the data structure. Data structures storing network topology models may be implemented as hierarchical levels of elements storing related, overlapping, and/or alternative portions of network topologies. A network topology model may be generated for deployment by combining the portions of network topologies stored within a branch of elements in the hierarchy, and the model may be deployed across one or more workload resource domains. Modifications to network topology models may be applied to individual elements and/or propagated to related elements based on the relationships and metadata defined for the in the hierarchical structure.

20 Claims, 11 Drawing Sheets

(51) Int. Cl.
*G06F 12/0866* (2016.01)
*G06F 12/0888* (2016.01)
*H04L 41/0813* (2022.01)
*H04L 41/12* (2022.01)
*H04L 41/084* (2022.01)
*H04L 41/14* (2022.01)

(56) References Cited

U.S. PATENT DOCUMENTS

| | | | |
|---|---|---|---|
| 8,005,879 B2 | 8/2011 | Bornhoevd et al. | |
| 8,880,726 B2 * | 11/2014 | McNamee | H04L 41/12 709/227 |
| 9,094,287 B2 * | 7/2015 | Martineau | H04L 45/02 |
| 9,124,507 B1 | 9/2015 | Sella et al. | |
| 10,148,551 B1 | 12/2018 | Wood et al. | |
| 10,171,383 B2 | 1/2019 | Johnston et al. | |
| 10,567,230 B1 | 2/2020 | Song et al. | |
| 10,691,504 B2 | 6/2020 | Liu et al. | |
| 10,693,711 B1 | 6/2020 | Garg et al. | |
| 10,872,029 B1 | 12/2020 | Bawcom | |
| 2003/0063571 A1 * | 4/2003 | Ikeda | H04L 41/12 370/254 |
| 2006/0149782 A1 * | 7/2006 | Yeh | G06F 8/20 |
| 2013/0091283 A1 | 4/2013 | Omar | |
| 2014/0192676 A1 * | 7/2014 | Sullivan | H04L 41/12 370/254 |
| 2015/0188989 A1 | 7/2015 | Chaliparambil et al. | |
| 2016/0094383 A1 | 3/2016 | Wang et al. | |
| 2016/0188355 A1 | 6/2016 | Cao et al. | |
| 2016/0191391 A1 | 6/2016 | Wood et al. | |
| 2016/0321378 A1 * | 11/2016 | Kagan | G06F 16/9024 |
| 2016/0344772 A1 | 11/2016 | Monahan et al. | |
| 2017/0048110 A1 * | 2/2017 | Wu | H04L 45/02 |
| 2017/0104636 A1 | 4/2017 | Vora et al. | |
| 2017/0127427 A1 | 5/2017 | Claridge et al. | |
| 2017/0207980 A1 | 7/2017 | Hudis et al. | |
| 2017/0317780 A1 | 11/2017 | Wood et al. | |
| 2019/0220321 A1 * | 7/2019 | Yang | H04L 41/0806 |
| 2019/0363938 A1 | 11/2019 | Liebinger Portela et al. | |
| 2020/0159715 A1 * | 5/2020 | Aakolk | G06F 16/282 |
| 2020/0259715 A1 | 8/2020 | Schermann et al. | |
| 2020/0358804 A1 | 11/2020 | Crabtree et al. | |
| 2021/0075816 A1 | 3/2021 | S | |
| 2021/0367849 A1 | 11/2021 | Kandaswamy et al. | |
| 2021/0367852 A1 | 11/2021 | Kandaswamy et al. | |
| 2021/0392049 A1 | 12/2021 | Jeuk et al. | |

OTHER PUBLICATIONS

Office Action for U.S. Appl. No. 16/901,558, dated May 11, 2021, Jeuk, "Machine-Learning Infused Network Topology Generation and Deployment", 9 Pages.

Office Action for U.S. Appl. No. 16/901,558, dated Dec. 1, 2021, Jeuk, "Machine-Learning Infused Network Topology Generation and Deployment", 13 pages.

* cited by examiner

MODEL TREE METDATA

400A

| Relationship IDs | Weight | Update Frequency (Secs) |
|---|---|---|
| 301-302 | 100 | 10 |
| 301-303 | 50 | 5 |
| 301-304 | 50 | 10 |
| 302-305 | ... | ... |
| ... | ... | ... |
| 305-311 | 50 | 20 |
| 305-312 | 100 | 10 |

FIG. 4A

TENANT DEPLOYMENTS

400B

| Element ID | Tenant ID(s) |
|---|---|
| 301 | 1, 15, 16, 17 |
| 303 | 4, 5, 7 |
| 305 | 8, 9, 11 |
| 308 | 2, 3 |
| 310 | 6, 18 |
| 311 | 10, 14 |
| 312 | 12, 13 |

FIG. 4B

GENERATION AND DEPLOYMENT OF INHERITED NETWORK TOPOLOGY MODELS

TECHNICAL FIELD

The present disclosure relates to generating network topology models and deploying network topologies within workload resource domains based on the models. In particular, the present disclosure describes techniques for storing related network topology models within data structures, supporting inheritance of topology definitions and other characteristics between the models in the data structure, and initiating and tracking tenant deployments of the network topology models in the data structure.

BACKGROUND

Cloud computing involves using a network of servers hosted remotely on the Internet, rather than local servers or personal computers, to store, manage, and process data. Cloud computing networks for large-scale systems may use deployment models in which private clouds and/or on-premise infrastructures may be allocated for storing or processing private and secure data, while one or more public clouds may be used for storing or process other non-secure system data. These hybrid cloud computing environments may allow architectural flexibility and scalability with respect to processing demand, as well as allowing integration of specialized computational models.

When designing a network topology model including various computing nodes, storage nodes, network nodes, etc., within computing environments, multiple models may be supported to allow system administrators to select particular data to be stored or particular services to be executed within different workload resource domains (e.g., public or private clouds, on-premise computing infrastructures) depending on the factors such as cost, user requirements, sensitivity of the data, and the available resources within the various workload resource domains. However, such hybrid cloud networks may be complex and costly to design, deploy, and maintain, due to the potential functional disparities between the different workload resource domains, dynamic alterations that may be performed within individual workload resource domains after deployment of the topology, and the splitting of system management responsibilities between the public cloud providers, private cloud providers, and on-premise infrastructure administrators. Further, even after generating, verifying, and optimizing a network topology model, particular tenant deployments of the model may require additional modifications and adjustments from the base model.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 4A and 4B are example data tables storing metadata (FIG. 4A) and tenant deployment data (FIG. 4B) associated with a data structure storing network topology models.

DESCRIPTION OF EXAMPLE EMBODIMENTS

Overview

Figure 1:
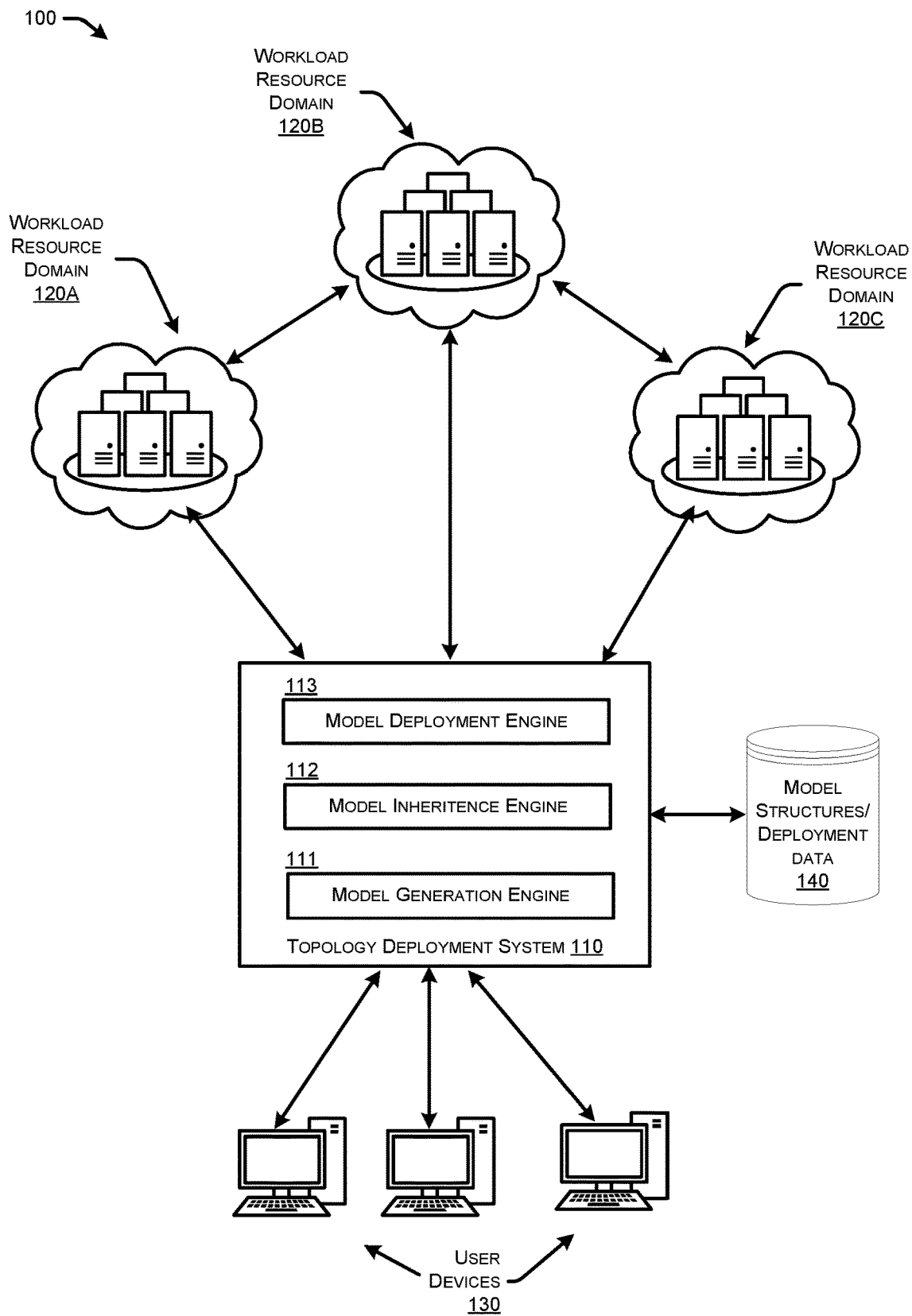
FIG. 1 illustrates a hybrid computing environment including multiple workload resource domains and a topology deployment system configured to generate and deploy network topologies within the workload resource domains.

This disclosure describes techniques for storing network topology models within data structures, supporting inheritance of topology definitions and other characteristics between the models (or model variations) in the structure, and initiating and tracking tenant deployments of the network topology models in the structure. In some examples, a tree structure or other hierarchical data structure may be used to store a network topology model. A hierarchical structure may include a root element storing a complete network topology model, and one or more additional levels including additional elements storing portions of the overall topology. Within the hierarchical structure, child elements may inherit subsections of network topology definitions and/or model characteristics from related elements, such as parent or sibling elements in the hierarchical structure. However, each element in the structure also may define a distinct portion of the network topology and/or model characteristics which may be compatible or incompatible with the network topologies and/or characteristics in other elements of the structure.

Using the inheritance relationships between the elements of the data structure, various network topology models may be generated and deployed for different tenant deployments. Different portions of network topologies stored at related elements of the data structure may be combined to form complete network topology models. For example, each element within a tree or hierarchical data structure may be combined with its parent elements and root element to generate a network topology model specific to the element. Modifications to network topology models may be applied at individual elements within the data structure and propagated to related elements. In some examples, hierarchical data structures may store metadata information for child-parent relationships to define the capabilities of the relationship and determine when and how modifications to network topology models are propagated through the hierarchy. Additional changes to the model may be applied at the root element and propagated throughout the hierarchy, allowing quick and universal changes to be applied to the variations of network topology models stored by the hierarchy. Tenant deployments also may be tracked, including which deployments implement which branches of the hierarchical structure, and when the deployments have been updated based on changes to the network topology model made within the hierarchy.

The techniques described herein may be performed as methods, or by computing devices and/or system having processors and memory units, or may be embodied in non-transitory computer-readable medium storing processor-executable instructions that, when executed by one or more processors, performs the technique described.

EXAMPLE EMBODIMENTS

This disclosure describes techniques for generating network topology models, as well as deploying and modifying network topologies based on the network topology models, with one or more workload resource domains (e.g., public clouds, private clouds, on-premise computing infrastructures, etc.). A network topology may refer a distributed computing system, including a number of different nodes that may be individually designed and/or configured to perform particular functionality, and where the nodes are deployed and configured to communicate with one or more other nodes in the topology to provide the overall functionality of the topology. A node within a network topology may refer to any hardware component, software component, or combination of hardware-software component that may operate in a computing infrastructure and/or computing network environment. For example, a network topology deployed within a workload resource domain or across multiple workload resource domains may include various nodes designed and configured to operate as network node devices, computing node devices, storage node devices, operating systems, software applications and services, virtual computing machines or instances, etc. Network nodes, for example, may include computing devices such as routers, servers, switches, load balancers, wireless access points, etc., running various software versions and/or having other attributes. Storage node devices may include various types of dedicated storage systems, compute nodes may include physical servers or other dedicated processing devices, and so on. Network topologies may be deployed to implement enterprise systems and other large-scale computer systems. Thus, it should also be understood that network topologies as described herein are not limited to topologies of network elements (i.e., OSI Layer 2-4). For instance, the systems and techniques described herein for inheriting, generating, and deploying network topologies also apply to network topologies representing a service mesh (e.g., a Layer 7 topology of micro-services integrated in a service mesh), and various other network topologies defined on layers above the OSI network layers 2-4.

In some example described herein, network topologies may be deployed across multiple workload resource domains. A workload resource domain may refer to any computing resource container, such as public cloud computing environment, a private cloud computing environment, an on-premise datacenter, or other computing infrastructure. In these hybrid network topologies, different nodes of a topology may be deployed and instantiating within different workload resource domains. Hybrid topologies may provide certain advantages for designing and deploying large-scale computing systems. For example, certain network topologies may use deployment models in which private clouds and/or on-premise infrastructures are allocated to store and process private and secure data, while one or more public clouds may be used to store or process other non-secure system data. Hybrid network topologies also may allow for architectural flexibility and scalability with respect to changes in processing demand over time, as well as allowing integration of specialized computational models.

A network topology deployed within one or more workload resource domains may be based on a network topology model (which also may be referred to as a "formal model"). Initially, a logical (or intent-based) topology model may be created based on input received from a client system of an administrator, tenant, etc. A formal network topology model may be based on the logical model, and then used for deployment and instantiating of network topologies that are functionally equivalent to the logical model. A model generation engine may validate the correctness of the logical model without the need for test-based verification, and a model deployment engine may transmit deployment instructions to the workload resource domains to generate a physical realization of the network topology. For example, for hybrid network topologies the deployment instructions may be transmitted between gateways in different workload resource domains.

As described below in more detail, a hierarchical data structure may use model inheritance between elements to store representations of a network topology model and/or multiple variations of a network topology model. For example, a deployment computing system may receive a request to generate a network topology model within one or more workload resource domains (e.g., public clouds, private clouds, on-premise datacenters or computing infrastructures, etc.). The deployment system may determine an element in a data structure associated with the request, and may retrieve data stored at the element representing a first portion of a network topology. Using relationships and/or metadata associated with the data structure (e.g., child-parent relationships in a tree structure), the deployment system may determine one or more associated elements within the data structure, and may retrieve additional portions of network topologies stored at the associated elements. The deployment system may then generate a complete network topology model based on the various portions of network topologies retrieved from the different elements of the data structure. For instance, the deployment system may combine and integrate different portions of network topologies stored in the elements along a particular branch of the tree structure. Deployment instructions may be generated and transmitted to the appropriate nodes within the workload resource domain(s) to deploy and instantiate a network topology corresponding to the model.

In some examples, the data structure storing representations of the network topology model may be a tree or other hierarchical data structure, comprising a root element at a root level and a plurality of additional elements arranged in one or more additional levels of the hierarchical structure. The deployment system may support operations to traverse the hierarchical structure from a first element representing the network topology model to be deployed, to the root element. Separate portions of the network topology may be retrieved from each element during the traversal and combined to generate the network topology model. In some cases, certain nodes within a portion of the network topology stored at an element in the hierarchical structure and/or other model characteristics may be incompatible with other network topology portions or other model characteristics of the elements within the same branch of the structure. The resolution of such incompatibilities may be based on the model inheritance techniques implemented for the hierarchical structure, including determining which portion of network topology are closer or further from the root element, other inheritance relationships, and/or metadata information defined for the relationships in the hierarchical structure.

For a network topology model stored within hierarchical data structures, modifications to the model may be initiated and applied at an individual element within the hierarchical structure, and may and may not be propagated to related elements. For example, the deployment system may use metadata information associated with the child-parent relationships of the hierarchical structure to determine if and when modifications to a network topology model at one element are propagated to other elements in the hierarchy. For instance, the deployment system may store and use weight metadata and/or update frequency metadata for the child-parent relationships within the hierarchical structure, control when and how changes to particular variations of the network topology model are propagated throughout the hierarchical structure. Additionally, the deployment system may be configured to store and track tenant deployments, including data indicating which deployments implement which branches of the hierarchical structure, and when a deployment has been updated in response to modifications to the network topology model.

The techniques described herein may provide various technical advantages and improvements, including at least (i) improvements in generating network topology models for deployment within workload resource domains, by using data structures supporting model inheritance to represent different variations of network topology models for different tenant deployments, (ii) improvements in tracking and dynamically modifying individual deployments and/or groups of deployments, using the model inheritance within hierarchical data structures.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example hybrid computing environment 100, including a topology deployment system 110, multiple workload resource domains 120, and user devices 130. As described below in more detail, the topology deployment system 110 may be configured to generate, deploy, and modify network topology models within the computing environment 100.

As discussed above, large-scale and complex network topology models may be implemented within a single workload resource domain 120, or deployed as a hybrid topology across multiple workload resource domains 120. Hybrid topologies may include many different nodes of various node types (e.g., network device nodes, storage device nodes, computing device nodes, software application or service nodes, virtual machines or instances, etc.), which may interact and communicate across different workload resource domains 120 to provide the functionality of the overall topology. A workload resource domain 120 may refer to any dedicated pool of computer resources from which one or more nodes may be allocated for a network topology or other computing system. For instance, workload resource domain 120A may correspond to a first public cloud computing environment, workload resource domain 120B may correspond to a second public cloud computing environment or to a separate private cloud computing environment, and workload resource domain 120C may correspond to yet another public or private cloud computing environment or to an on-premise datacenter, and so on. Although three workload resource domains 120 are shown in this example, the network topology models described herein may be deployed across any number (e.g., 1, 2, 3, 4, 5, etc.) of different public clouds, public clouds, private clouds, on-premise datacenters, and/or other resource pools.

In various examples, each of the workload resource domains 120 (which also may be referred to as domain infrastructures) of the multi-domain computing environment 100 may generally represent or comprise a resource pool. The resource pool of each workload resource domain 120 may comprise a data center, multiple data centers within the same enterprise, multiple data centers across enterprises, etc. As a specific example, a campus network of a school may be a type of workload resource domain 120A that is connected to a data center running in another workload resource domain 120B by a connection through one or more networks, such as the Internet. Both of the workload resource domains 120A and 120B may further be connected to a public cloud provider 120C as a third domain infrastructure. This is one example of the types of workload resource domains 120 that may be interconnected to create a multi-domain environment 100. Generally, a workload resource domain 120 may comprise a set of resources that are managed, operated, and/or owned by the same or by different entities. In one specific example, the multi-domain environment 100 may comprise a multi-cloud environment that includes multiple public clouds, multiple private clouds (e.g., enterprise networks), a public cloud in combination with a private cloud/network, etc. However, the multi-domain environment 100 may also be utilized in other technologies. For instance, the multi-domain environment 100 may comprise domains of different devices in an Internet-of-Things (IoT) environments where each domain is a different grouping of IoT devices, and the domains are interconnected to form the multi-domain environment 100. Generally, the multi-domain environment 100 may comprise groupings of devices in different technology areas and/or different types of devices assigned to multiple domains that are connected to each other.

In some examples, the topology deployment system 110 may be coupled via computer networks (directly or indirectly) to a multi-workload resource domain network (e.g., multi-cloud network) that may include the Internet, one or more private clouds, public clouds, and/or other resource pools (e.g., on-premise datacenters). The deployment system 110 may include components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer and/or general-purpose computer.

The different nodes types that may operate within a network topology (e.g., network nodes, compute nodes, storage nodes, software application or service nodes, virtual machine instance nodes, etc.) each may correspond to or may be executed on one or more computers. As used herein, a "computer" may refer to one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, computer network devices such as gateways, modems, routers, access points, switches, hubs, firewalls, and/or any other special purpose computing devices.

In some examples, the topology deployment system 110 may include one or more of a model generation engine 111, a model inheritance engine 112, and/or a model deployment engine 113. The model generation engine 111 may determine formal network topology models for deployment, based on logical (or intent-based) models and other inputs such as resource inventories of the workload resource domains 120, constraint inputs provided by a system architect or administrator, and/or performance data received from deployed topologies. The model generation engine 111 may transmit the formal topology model for the network deployment, to the model deployment engine 113, which may include various subcomponents configured to verify and optimize the network topology, and deployment generation instructions to generate the topology within one or more of the workload resource domains 120. For example, deployment generation instructions may be transmitted to gateway devices or other systems within the workload resource domains 120 to deploy (e.g., instantiate objects, allocate memory, configure processes, etc.) the particular nodes of the topology within the proper workload resource domains 120.

The model inheritance engine 112 may receive network topology models (e.g., formal models) from the model generation engine 111 and/or model deployment engine 113, and may store representations of the models in a data store 140. Although data store 140 is depicted as a remote database system in this example, in other examples the data store 140 may be integrated within topology deployment system 110. As noted above, the model inheritance engine 112 may generate and maintain specialized data structures within the data store 140 to store network topology models. Data structures within the data store 140 storing representations of the network topology models may be implemented as tree structures or other hierarchical data structures having multiple levels with one or more elements at each level. Each element in a hierarchical data structure may represent a distinct formal model that may be deployed within the workload resource domains 120. For example, when a network deployment is requested based on an existing network topology model, the model inheritance engine 112 may access a particular element in the hierarchy representing the requested formal model, and then retrieve the network topology model data from element (and/or related elements) and provide the requested network topology model to the model deployment engine 113 for deployment.

The model inheritance engine 112 also may determine and/or define relationships between different network topology models, and provide inheritance functionality between the corresponding elements in a hierarchical structure, whereby portions of network topologies and/or other model characteristics may be inherited from one element to one or more related elements in the hierarchy. In some cases, the different network topology models may be similar models, in which minor adjustments or configurations have been made to one deployment but not to other deployments based on the same formal model. For example, the topology deployment system 110 may generate two separate deployments based on the same formal model within workload resource domains 120, but then may modify one (or both) of the deployments so that the underlying formal models of the deployments are no longer identical. Such modifications may include changes to the nodes within the network topology model, different sets of constraints, different tenant-specific preferences or cost considerations, etc. Additionally, the modifications to a particular deployment may be performed before the initial deployment of topology (e.g., based on differences in constraints, tenant preferences, resource inventories, etc.), or after the initial deployment (e.g., based on deployment usage and network traffic patterns, performance metrics, updated resource inventories, etc.).

Continuing the above example, when an existing network topology model is modified for a new deployment, the model inheritance engine 112 may create a new element in the hierarchical data structure for the modified network topology model. Depending on the extent of the modifications, the existing and modified network topology models may be similar, and their corresponding elements within the hierarchical structure may be closely related. For example, the new element in the hierarchy may be added as child to the element representing the existing hierarchy. In some cases, the new child element may store data representing the differences between the modified formal model and the existing model from which it was generated, and the model inheritance engine 112 may link the elements and provide inheritance for the common portions of the topology and/or other model characteristics from the parent element to the child element.

In some examples, the model inheritance engine 112 also may monitor the structure of the hierarchy and periodically reorganize the structure. During a reorganization, the model inheritance engine 112 may reposition elements within the hierarchy, add or remove levels in the hierarchy, change child-parent relationships, and/or restructure the branches within the hierarchy. Hierarchy reorganizations performed by the model inheritance engine 112 may improve the balance and symmetry of the hierarchy for improved performance of model operations (e.g., branch traversals, propagating modifications, etc.), and also may improve the branch grouping and inheritance relationships between network topology models so minor variations or derivations between models and/or other similar models may be closely related in the hierarchy.

Additionally, the model inheritance engine 112 may define and store metadata information associated with individual elements and/or relationships between elements for the hierarchical structure(s) stored in the data store 140. For example, for an element in the hierarchical structure corresponding to a particular network topology model, the model inheritance engine 112 may store metadata for the element identifying which tenant deployment(s) have been deployed and instantiated based on the particular model, when the deployment was last updated to reflect changes to the model, etc. Additionally, for any child-parent relationships defined by the hierarchical structure, the model inheritance engine 112 may store metadata such as weight value and/or update frequencies. The model inheritance engine 112 may use the different weights and update frequencies stored for different relationships in the hierarchical structure to determine which changes to network topology models are propagated to other models in the hierarchy, and when, as well as how incompatibilities between models are resolved. In some examples, the metadata for elements and relationships in a data structure may be stored within the data structure itself. Additionally or alternatively, metadata for elements and/or relationships may be stored in separate tables (e.g., 208 and 209) and/or other data stores separate from the structure storing the formal model representations.

Although not shown in FIG. 1 so as not to obscure the other features depicted therein, a hybrid computing environment 100 (which also may be referred to as a multi-cloud network, or a multi-resource pool network, etc.) may include any combination of one or more data communication networks through which the workload resource domains may communicate. Such data communication networks may include local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. Workload resource domains 120 (e.g., private cloud network(s), public cloud network(s), on-premise datacenter(s), etc.), as well as topology deployment systems 110 and other elements of the environment 100 may each comprise a compatible interface and may be programmed or configured to use standardized protocols for communication across the networks such as TCP/IP, Bluetooth, and higher-layer protocols such as HTTP, TLS, and the like.

Each workload resource domain 120 may be implemented using a server-class computer or other computers having one or more processor cores, co-processors, or other computers. Workload resource domains 120 may include physical server computers and/or a virtual server instances stored in a datacenter, such as through cloud computing. Additionally or alternatively, workload resource domains 120 such as public and/or private cloud networks, may comprise one or more applications executing on a server computer system which comprises instructions for application modeling and appliance/hardware mapping. Workload resource domains 120 may further comprise one or more network policies using notions such as templates or profiles that can be applied to different points in the hybrid computing environment 100.

In some examples, the topology deployment system 110 may be distributed across one or more of the workload resource domains 120, which may be bridged by a cloud service configured to integrate and virtualize various hierarchical layers of different public or private cloud networks, on-premise datacenters, etc. The individual workload resource domains 120 may comprise respective gateways (e.g., cloud gateways) that may translate cloud storage Application Programming Interfaces (APIs) to block-based storage protocols by using standard network protocols which integrate with existing applications within hybrid computing environment 100.

Deployment of network topology models within workload resource domains 120 may be initiated by a request from a tenant user or system administrator via a user device 130. For such requests, the model generation engine 111 may receive logical (e.g., intent-based) model input describing a prospective network topology and/or predefined constraints to be placed on the formal/physical topology model. In some examples, the model generation engine 111 also may use resource inventory data received from the workload resource domains 120 and/or operational feedback data from existing deployments executing in the workload resource domains 120, to determine a formal network topology model based on the logical model received via the user device 130. After determining a formal model for deployment, the topology deployment system 110 may generate the physical network topology for deployment within the workload resource domains 120, including transmitting sets of deployment instructions from the model deployment engine 113 to gateways within the different workload resource domains 120. In some examples, the physical network topology determined within the model generation engine 111 may be subjected to formal model checking to determine whether it is functionally equivalent to the logical model input. Upon establishing functional equivalence between the logical model input and the physical topology that was generated, the deployment instructions may be considered verified, and an actual realization of the generated hybrid network topology may be initiated.

In some examples, the inputs received from the user device 130, such as a logical topology, constraints, and/or deployment preferences, may account for multiple workload resource domains 120. For example, the inputs may specify at least one specific on-premise resource pool and/or private cloud associated with a tenant, enterprise, or organization. The organization may operate programs, service models, and applications residing in their on-premise datacenter and/or private cloud. Such programs, service models, and applications may include software-as-a-service (SaaS) programs, platform-as-a-service (PaaS) programs, infrastructure-as-a-service (IaaS) programs, Load Balancing-as-a-service (LBaaS) programs, application frontends, application backends, application classification programs, firewalls or others.

During the generation of the formal model, the model generation engine 111 may use partial order reduction model checking for model verification. In some examples, the constraint inputs received from network tenants, administrators, etc., may specify one or more constraints upon the realization of the logical topology within individual private cloud computing infrastructures and/or individual public cloud computing infrastructures within the computing environment 100. The model generation engine 111 may optimize the intermediate topology based upon the constraint input, including remapping the intermediate topology to an optimized network topology by moving functional elements (e.g., nodes or groups of nodes) from a first workload resource domain (e.g., a public cloud) in the intermediate topology, into a different workload resource domain (e.g., a private cloud or on-premise datacenter) in the final formal network topology. In some cases, constraint inputs may specify one or more attributes of a private cloud infrastructure or public cloud infrastructure.

Each of the workload resource domains 120 may be described as a single computing network or combination of networks, including a number of network devices configured for intranetwork and internetwork communications. Such network devices may include any type of networking device, such as servers, switches, routers, hubs, bridges, gateways, modems, repeaters, access points, etc. Additionally, these network devices may include personal, user devices such as phones, tablets, wearables devices, or other personal computing devices. The network devices may comprise physical nodes (e.g., processors, chipsets, devices, etc.), virtual nodes (virtual machines, containers, etc.), and/or any combination thereof.

Individual workload resource domains 120 may, in some cases, correspond to datacenters operating in one or more physical locations. Such datacenters (or other physical locations) may be physical facilities or buildings located across geographic areas that designated to store networked devices that are part of the corresponding workload resource domain 120. These data centers also may include various networking devices, as well as redundant or backup components and infrastructure for power supply, data communications connections, environmental controls, and various security devices. In some examples, a workload resource domain 120 may include one or more virtual data centers which are a pool or collection of cloud infrastructure resources specifically designed for enterprise needs, and/or for cloud-based service provider needs. Generally, the workload resource domains 120 (physical and/or virtual) may provide basic resources such as processor (CPU), memory (RAM), storage (disk), and networking (bandwidth). However, in some examples the network devices of the workload resource domain 120 might not be located in explicitly defined datacenters, but may operate from other physical locations.

The user devices 130 through which the topology deployment system 110 may be controlled, may comprise any type of computing device through which a user is able to interact with other devices (e.g., phones, tablets, personal computing devices, wearable devices, network devices, etc.). In some examples, users of the user devices 130 may have registered accounts with the topology deployment system 110 in order to generate models, create and modify topologies, and deploy topologies within the workload resource domains 120. For instance, a topology design tool, constraint input tool, and/or optimization or recommendation tools may be provided by the topology deployment system 110 and accessible to authorized users at user devices 130 via a client portal (e.g., command line interface (CLI), application programming interface (API), web-based portal, etc.) and/or user interfaces. The user devices 130 may operate within and communicate with the topology deployment system 110 (and/or any other devices in the computing environment 100) over one or more networks, including any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof.

As described herein, the topology deployment system 110 may include one or more computing devices (e.g., a single device, multiple devices, network(s) of devices, etc.) comprising one or more processors configured to execute various computer-executable instructions. Additionally, topology deployment system 110 may include components, modules, etc., that are stored on non-transitory computer-readable media and configured to perform the techniques and operations described herein as being performed by the topology deployment system 110. For instance, the topology deployment system 110 may include the model generation engine 111, the model inheritance engine 112, the model deployment engine 113, and/or any other number or arrangement of components. The components described herein are merely illustrative, and any number or configuration of components may be utilized to perform the techniques described herein.

Figure 2:
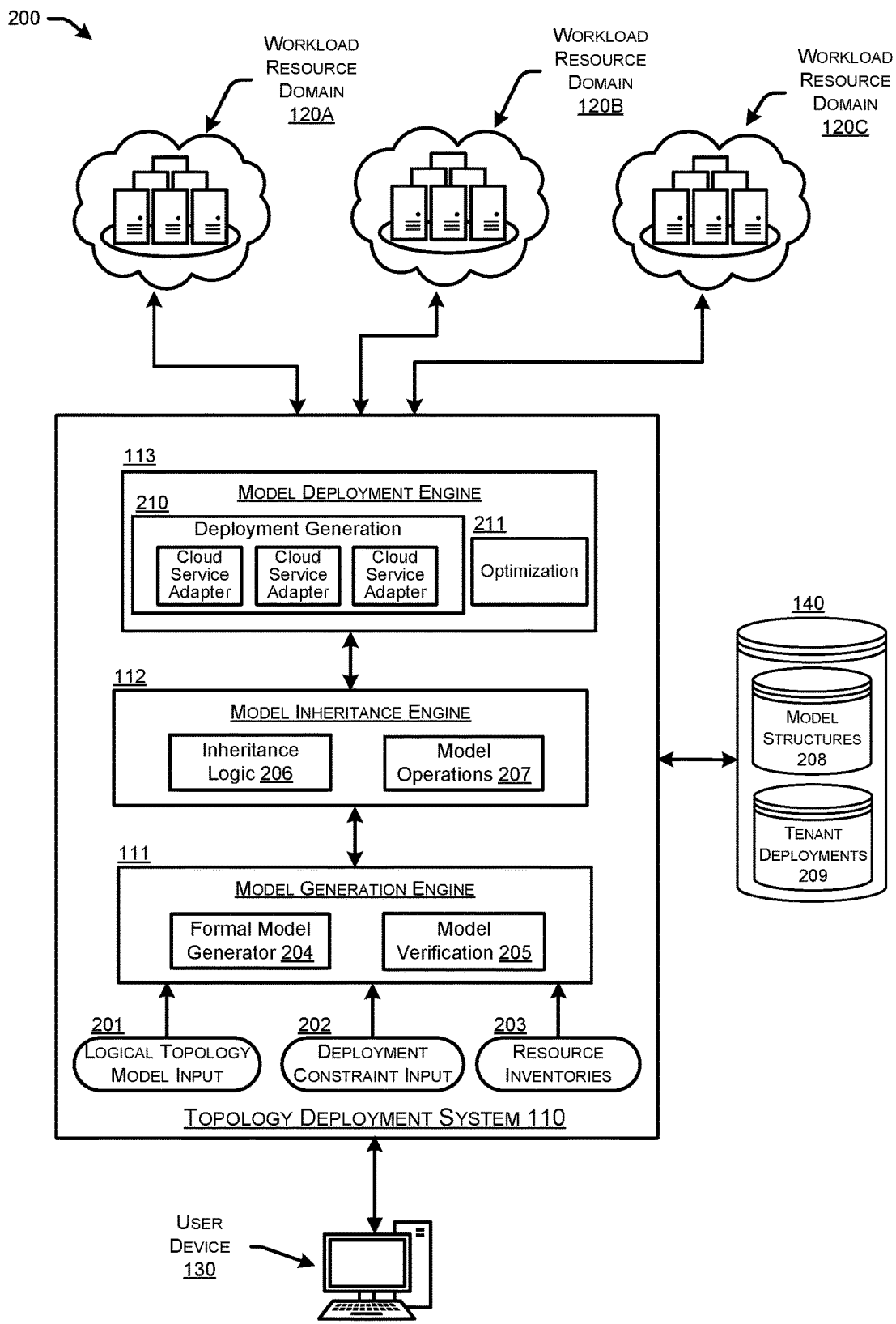
FIG. 2 illustrates a system diagram of an example topology deployment system configured to generate network topology models, support inheritance between associated network topology models, and deploy network topology models within the workload resource domains.

FIG. 2 illustrates a system diagram of an example topology deployment system configured to generate, store, and deploy network topology models using inheritance between related models. The computing environment 200 illustrated in this example may be similar or identical the computing environment 100 discussed above in reference to FIG. 1. As depicted in this example, the computing environment 200 may include a topology deployment system 110, one or more workload resource domains 120 (e.g., public clouds, private clouds, on-premise datacenters, and/or other resource pools), and one or more user devices 130 through which authorized users (e.g., topology tenants, clients, administrators, etc.) may provide inputs to and may interact with the tools and user interfaces of the topology deployment system 110.

As described above, the model generation engine 111 may generate and verify formal network topology models, based on logical/intent-based models provided by a tenant or administrator system. Within the model generation engine 111, a formal model generator 204 may be configured to determine a formal model (e.g., a physical computing/network topology to be deployed within workload resource domain(s) 120). The formal model generator 204 may determine the formal model based on the logical topology model input 201, the deployment constraint inputs 202, resource inventories 203 for the workload resource domains 120, and/or other data such as tenant or administrator preferences, or operational status and performance data received from the workload resource domains 120.

Constraint inputs 202 may include user-defined deployment conditions, specifications, or limitations that may be provided by a tenant or an administrator user when requesting a new deployment of a network topology. In some examples, constraint inputs 202 may be predefined as policies of the topology deployment system 110 and/or the workload resource domains 120. Constraint inputs 202 may be associated with any node or group of nodes within a network topology, or may be associated with the network topology as a whole. Examples of constraint inputs 202 may include requirements for specific nodes (and/or types of nodes) to be deployed within specific workload resource domains 120, requirements for a group of associated nodes to be deployed on the same workload resource domain 120, requirements for minimum or maximum amounts of computing resources, storage resources, and/or network bandwidth to be provided to nodes or groups of nodes, etc. Additional examples of constraint inputs 202 may include specified numbers of virtual machine instances to be instantiated within a deployment, specified types of software products, versions, or configurations to be used within a deployment, and/or limits on pricing or cost or minimum amounts of storage, and the like. Constraint inputs 202 also include, but are not limited to, constraints on the placement of network functions permitted to be performed within a workload resource domain 120, the sensitivity level of data permitted to be stored within a workload resource domain 120, capacity expectations and/or data traffic expectations of a workload resource domain 120.

Resource inventories 203 may define the available resources within each of the workload resource domains 120, which may determine the limits for prospective deployments within the workload resource domains 120 (e.g., single cloud deployments, multi-cloud deployments, hybrid network deployments, etc.). In some examples, resource inventories 203 may include data specifying which workload resource domains 120 are currently available for deployment, the specific resources available within each workload resource domain 120 (e.g., the types of network devices and capabilities, the types of storage devices, the processing units, software services, and/or the types of virtual machine images that are available), and the current performance metrics and current processing loads on the nodes within the workload resource domains 120.

Deployment constraint inputs 202 and/or resource inventories 203 may be provided manually by a user or administrator via a user device 130. Additionally or alternatively, constraint inputs 202 and/or resource inventories 203 may be obtained programmatically from files or configuration data that has been stored for other purposes in any of the elements of computing environment 200. For example, network management computers within workload resource domains 120 may store or expose network element inventory data or constraints to API calls, parameterized URLs or other programmatic calls, and the topology deployment system 110 may be programmed to issue such calls to the workload resource domains 120 to obtain responses, objects or download files that contain resource inventory and/or constraint data. Both constraint inputs 202 and resource inventories 203 may be received and used as inputs to the model generation engine 111 to generate, verify, and optimize a formal network topology model that represents a physical realization of the logical model using the available resources within the workload resource domains 120. Constraint inputs 202 and resource inventories 203 may change dynamically based on workload, system/software upgrades, network traffic patterns, and other factors that may change during the operation of the deployed network topology.

After generating one or more prospective network topology models, based on the logical model input 201, constraint inputs 202, and/or resource inventories 203, the model generation engine 111 may validate and/or optimize the model(s) using the model verification component 206. The model verification component 206 may verify the functional equivalency of a prospective network topology model to the logical model input 201. The validated network topology model then may be provided to the model deployment engine 113, which may use a deployment generation system 210 and an optimization system 211 to physically deploy the network topology model, by transmitting sets of deployment instructions to gateways within the workload resource domains 120. The deployment instructions may allocate or instantiate new nodes for newly deployed network topology, or may modify existing nodes when updating previously deployed network topologies. In some examples, the deployment generation system 210 may include one or more cloud service adaptors used to generate specific configuration instructions for the resources in the various workload resource domains 120 (e.g., private clouds, public clouds, and/or on-premise enterprise networks of which the topology deployment system 110 may be a part). The cloud service adaptors may comprise executable code that causes generation of topologies specific to different technologies or services that are available only in specific different workload resource domains 120. Examples may include NMS or AWS, where NMS and AWS are two different cloud service providers each providing at least a portion of a public cloud infrastructure in which a network topology may be deployed.

The deployment and/or configuration instructions generated by the cloud service adaptors may be provided as input to the optimization system 211. In some examples, the optimization system 211 also may receive constraint inputs 202. For instance, the optimization system may process the deployment and configuration instructions based on the constraint inputs 202, to remap the network topology model to an optimized version that attempts to fulfill as many constraints as possible that are represented in the constraint inputs 202. The resulting network topology may be verified for functional equivalence with the logical topology model input 201. In cases, model verification instructions may be programmed to implement partial order reduction techniques for verification.

The model inheritance engine 112 may receive formal network topology models from the model generation engine 111 and/or the model deployment engine 113, and may store and manage the network topology models within the data store 140. As described above, the model inheritance engine 112 may store representations of multiple models in a hierarchical data structure 208, including defining child-parent relationships and implementing model inheritance between the different models in the data structure 208. In addition to storing network topology models within data structures 208, the model inheritance engine 112 also may define, store, and manage metadata information associated with individual models and/or relationships between the models in the data store 140.

As an example, the model inheritance engine 112 may receive data describing a first network topology model, from the model generation engine 111 or model deployment engine 113. The model inheritance engine 112 may store a representation of the first model at a first element in a hierarchical data structure 208. The representation of a network topology model may include data identifying the nodes to be deployed within the model, deployment locations of the nodes, the configuration settings and constraints associated with the nodes, and the networks channel by the nodes may communication within the deployment.

Continuing the above example, the model inheritance engine 112 may receive additional data describing a second network topology model. In some cases, the second model may be derived from or associated with the first model. For instance, the second model may be generated from the same base network topology as the first model, but may include one or more tenant-specific modifications (e.g., additional nodes, fewer nodes, different constraints, etc.). The second model also may be an existing model previously deployed within the workload resource domains 120, and is being dynamically modified by the topology deployment system 110. Thus, the first and second models may be similar in terms of nodes, relationships, and other model characteristics. However, in other cases the second model may be significantly different from the first model and/or may be entirely unrelated.

After receiving the data corresponding to the second topology model, the model inheritance engine 112 may create a new element within the hierarchical data structure 208 storing the first model, and may store representation of the second model at the new element. Thus, each element in the hierarchical data structure 208 may represent a separate network topology. When adding a new model to the hierarchical data structure 208, the model inheritance engine 112 may determine where to place the new element within the structure and which other elements in the structure should be linked to the new element. For instance, the second model is derived from the first model and includes only minor modifications, the model inheritance engine 112 may create the new element as a child element of the first element. The child element may store a data representation the entire second model, or may store data identifying the specific differences between the second model and the parent first model.

In the above example, the hierarchical data structure 208 now may have two linked elements, a first parent (and root) element storing a representation of the first model, and second child element storing a representation of the second model. In other examples, if the second model is not a derived from, a variation of, or structurally similar to the first model, the model inheritance engine 112 may select a different location for the second element in the hierarchical data structure 208. For instance, the second element may be added to a different branch of the hierarchy containing related or similar models to the second model, or the model inheritance engine 112 may start a new branch and/or entirely new data structure 208 for the second element.

The model inheritance engine 112 also may store and maintain metadata associated with each network topology model represented in the hierarchical data structure(s) 208, as well as metadata defining the relationships between models and characteristics of those relationships. For instance, in the above example the model inheritance engine 112 may store metadata for the first element, the second element, and separate metadata for the parent-child relationship between the first and second elements.

Figure 3A:
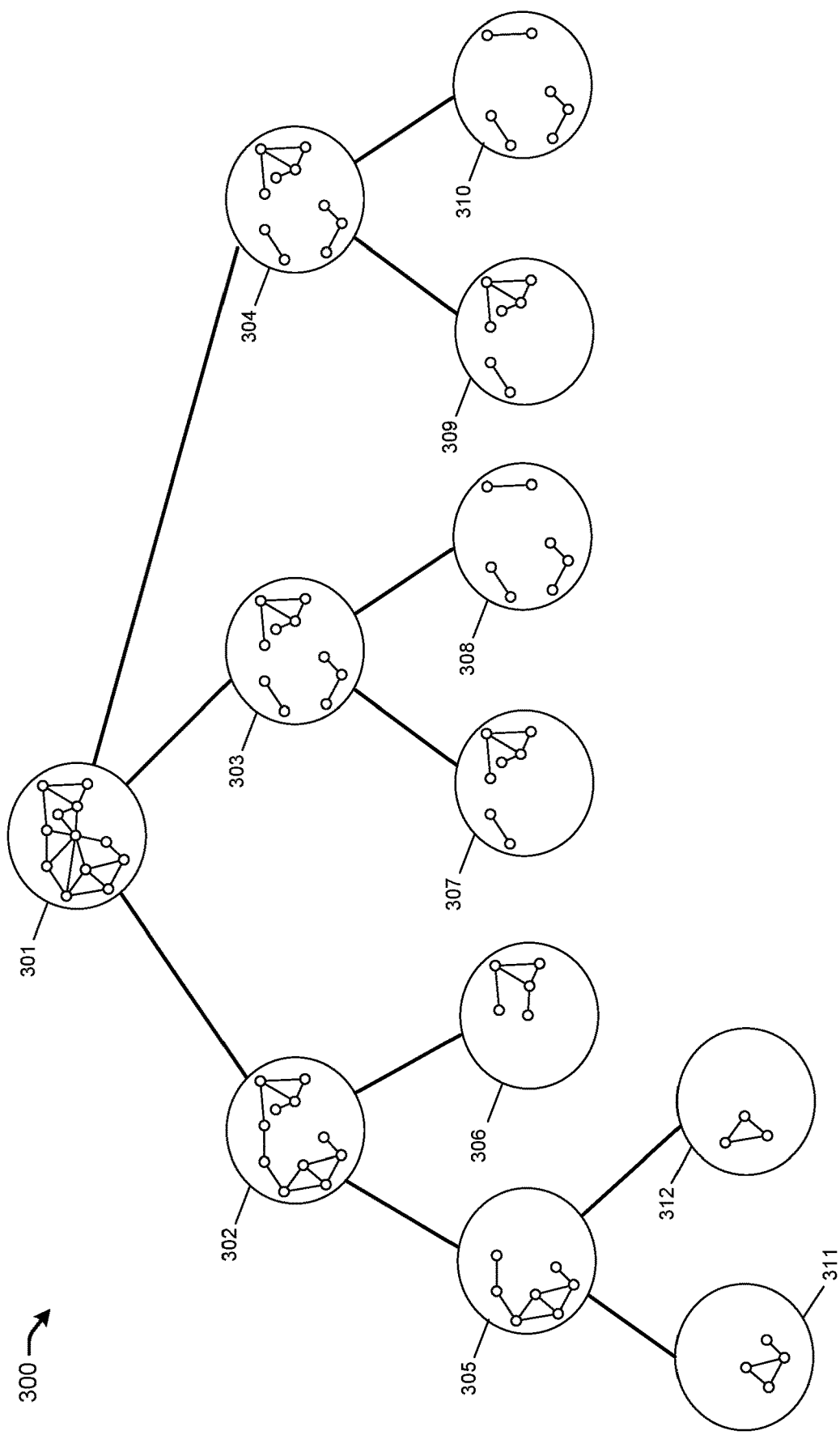
FIGS. 3A and 3B are graphical representations of an example hierarchical data structure storing network topology model data at elements of the data structure.

Referring now to FIG. 3A, graphical representation of an example hierarchical data structure 300 is depicted. As discussed in the above example, each separate element 301-312 in the hierarchy 300 may correspond to a distance network topology model. Hierarchy 300 also depicts the parent-child relationships which define model inheritance between the elements of the hierarchy. In this example, root element 301 may store a representation of a complete network topology model. Root element 301 has three child elements 302-304, which represent the first level of the hierarchy 300. The second level of the hierarchy 300 includes elements 305-310, each of which is a child element of one of the first level elements 302-304. The third level of the hierarchy 300 includes elements 311 and 312, which are child elements of the second level element 305. As shown in this example, each non-root element 302-312 in the hierarchy 300 may store portion of a network topology which is based on the root network topology stored at root element 301. For instance, root element 301 in this example may store a representation of a base (or complete) network topology model, and each child element may store a portion of the same or a related network topology. In some cases, a child element may store the portions of its network topology model which have differences from the model(s) stored by its parent element(s). In the example of FIG. 3A, each portion of the network topology stored at elements 302-312 is represented as a simplified set of circles and lines within the element, representing topology nodes and connections between those nodes. However, it is understood that these representations are simplified for illustrative purposes, and that within the model data structures 208, or at an associated storage location within the data store 140, each element of a hierarchical data structure 300 may store detailed model information including topology node types and deployment details, configuration settings, constraint data, etc.

As illustrated by the network topologies shown within the elements 301-312 in FIG. 3A, each element may store a separate portion of a network topology, and child elements may inherit portions of the network topology from their parent elements in the hierarchy 300. For example, element 312 may store only a small portion of a network topology but may inherit the remaining portions of the topology from parent elements 305, 302, and 301, which may be combined with the network topology (and/or other model characteristics) stored at element 312 to generate a complete network topology model for deployment. In some cases, a child element within a hierarchy 300 may store a subset of the network topology represented by its parent element. Additionally or alternatively, the child element may store a modified network topology that is different from the network topology of its parent element. Such differences between the network topologies of child and parent elements may be compatible (e.g., one or more additional nodes defined the child element, additional constraints or model characteristics applied, etc.) or may be incompatible (e.g., nodes removed from the parent topology, changes to parent constraints or model characteristics, etc.).

FIG. 3A depicts one example of a hierarchical structure 300 storing representations of network topology models. However, in other examples the model data structures 208 stored in data store 140 may be structured differently (e.g., binary or non-binary), may have different numbers of element, different levels, and different inheritance/dependency relationships. For instance, the numbers of levels within a hierarchy 300 may depend on the complexity and requirements that are defined for the overall network topology model. In some examples a model data structure 208 need not be a tree/hierarchical data structure, but instead may store a non-hierarchical arrangement of elements, with inheritance relationships defined between certain of the elements.

As noted above, hierarchical data structures 300 may be arranged in sub-levels of elements, where each child element in hierarchy 300 may represent a "sub-model," or subset of network topology model represented by its parent. When implementing a model hierarchy 300 based on an overall formal network topology model, the model inheritance engine 112 may determine the different subset portions of the network topology to be represented in branches of child elements using various different criteria. For example, the model inheritance engine 112 may determine branches of the hierarchy 300 based on subsets of node types, so that the subset of all network nodes in the overall formal model are represented in a first level-one child element, the subset of storages nodes are represented in a second level-one child element, and so on. Additional hierarchy levels may be used, if desired, to further subdivide by node type. For instance, a subset of the network nodes of a particular network device type may be represented in a first level-two element beneath the first level-one element, network nodes of a different device type may be represented in a second level-two element beneath the first level-one element, and so on.

In other examples, the model inheritance engine 112 may determine the sub-sets of nodes within the network topology model to be partitioned into different branches/elements using different criteria. In some cases, the model inheritance engine 112 may structure the model hierarchy 300 by grouping different subsets of nodes corresponding to different products or departments within an organization. In other cases, the model inheritance engine 112 may group nodes of the network topology based on the level of communications between those nodes within the deployed model. In still other cases, the model inheritance engine 112 may group nodes of the network topology by the location (e.g., geographic and/or within the computing environment 200) at which the nodes are deployed within the workload resource domains 120.

Figure 3B:
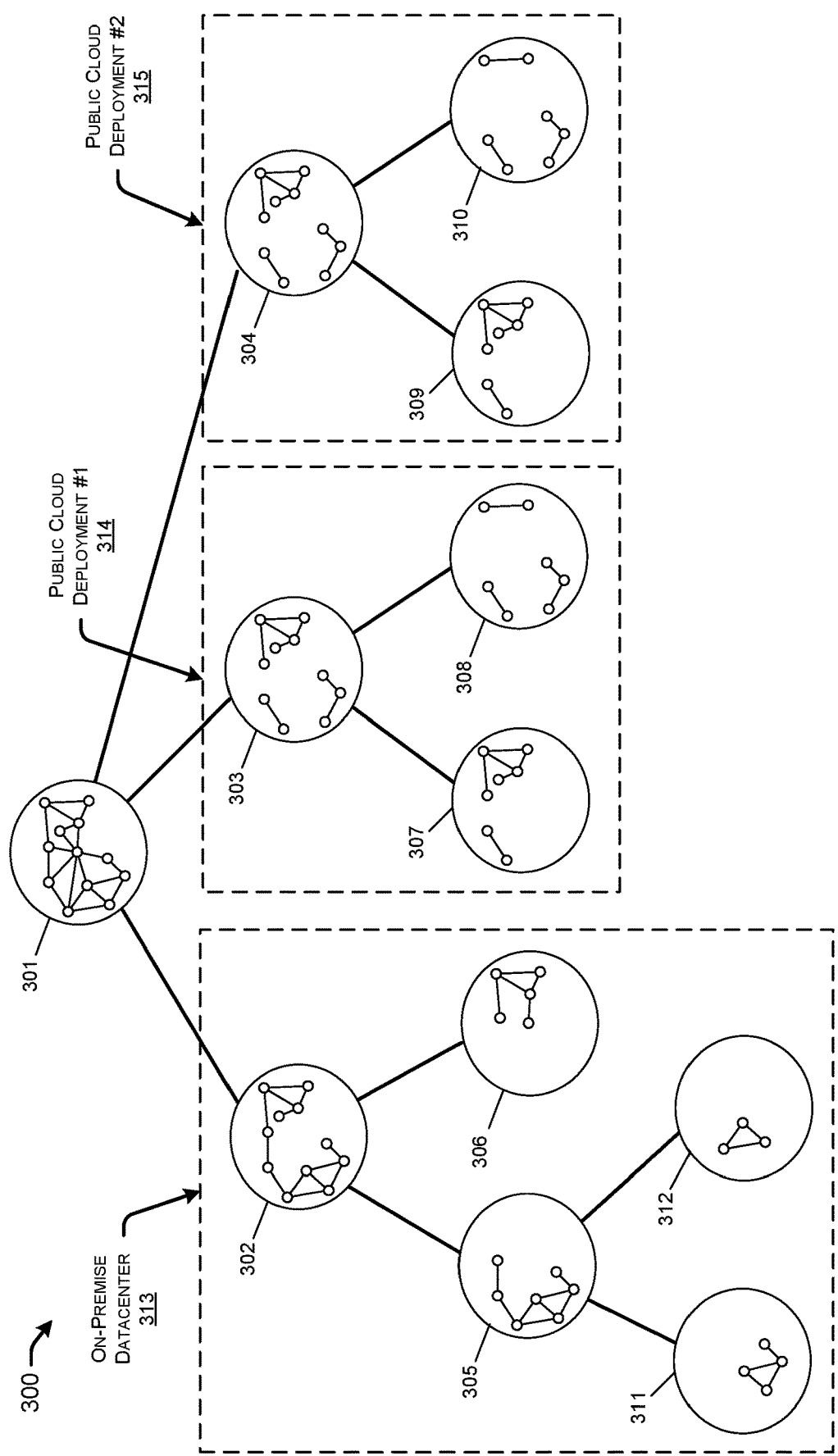

Referring to FIG. 3B, another representation of an example hierarchical data structure 300 is depicted. In this example, the overall formal model and example elements 301-312 of the hierarchy 300 may be identical to FIG. 3A. However, in this example, partitions 313, 314, and 315 are shown to illustrate different subset groupings of nodes for the different branches of the hierarchy 300. In this example, the first branch of the hierarchy 300 within the first partition 313 includes a set of elements representing the nodes in the topology that will be implemented in an on-premise datacenter, the second branch partition 314 of the hierarchy 300 includes elements representing the nodes that will be implemented in a first public cloud deployment, and the third branch partition 315 of the hierarchy 300 includes elements representing the nodes that will be implemented in a second different public cloud deployment.

In some cases, multiple deployment environments such as public clouds represented by branch partitions 314 and 315 may be formally defined in a similar or identical manner. In such cases, the model inheritance engine 112 may implement a hierarchical structure 300 such as the one shown in FIG. 3B, to allow dynamic adjusting of the base formal model between different cloud deployments. For instance, the sets of elements with a first cloud deployment represented by branch partition 314 and second cloud deployment represented by branch partition 315 may represent identical sets of nodes, and the model inheritance engine 112 may use metadata to select between the first and second cloud deployments and to dynamically switch between the cloud deployments as needed. Thus, the example in FIG. 3B illustrates overloading the hierarchy (e.g., with multiple alternative elements or branches) with formal model representations for different deployment locations, which may enable dynamic adjustments to be performed on deployments without having to first compute the formal model representations. Such examples may provide technical advantages, particularly for large deployments and environments where the generation of the formal model may be computationally intensive. In some examples, overloaded hierarchies that contain alternative elements/branches (e.g., 314 and 315) corresponding to different deployment locations may be used in time-of-day deployments. For instance, during certain hours of the day (and/or during certain days of the week, month, etc.), the network topology model may use the first public cloud deployment represented by branch partition 314, and different other hours of the day it may use the second public cloud deployment represented by branch partition 315.

As noted above, the model inheritance engine 112 also may define and store metadata information associated with individual elements and/or relationships between elements within hierarchical structures storing formal model representations. Referring briefly to FIGS. 4A and 4B, two example tables 400A and 400B are shown illustrating types of metadata that may be stored and used by the model inheritance engine 112. In table 400A, a set of model tree metadata is shown that includes weight values and update frequencies for each of the relationships in the example hierarchy 300. As described in more detail below, the model inheritance engine 112 may use the weight values of the parent-child relationships in the hierarchy 300, to resolve incompatibilities between the network topology portions in different elements and to ensure that topology modifications are propagated to related elements. The model inheritance engine 112 may use the update frequency metadata to determine how often modifications made to an element are propagated to the related elements in the hierarchy 300. Table 400B includes a set of tenant deployment data 209 for the example hierarchy 300. The model inheritance engine 112 may use tenant deployment data to track which particular network topology models are deployed by particular tenants. As discussed above, each element in a hierarchy 300 may represent a separate network topology model that may be deployed for a tenant. Table 400B and other tenant deployment data 209 may allow the model inheritance engine 112 to determine which tenants have utilized which deployments, providing technical advantages when updating the physical network topology deployments within the workload resource domains 120. Thus, tenant deployment data 209 for a hierarchy may track actual deployments on each level and/or for each element of the hierarchy 300.

In various examples described herein, the different linked hierarchy elements 301-311 provide different sub-sets versus super-sets of deployment information that are hierarchically linked and refer to each other in terms of updates, changes and other operations performed. A tenant can be associated to any of the hierarchical elements 301-311 or to multiple linked elements. For example, the root element 301 of the deployment hierarchy and relevant information could be associated with a common tenant. The next level down may represent multiple tenants that leverage the deployments described by any of the elements 302-304, and at the next level down different tenants can be associated to the additional deployments described by elements 305-310. Tenant information associated with the deployments on each level can be seen as metadata specific to a certain deployment at a certain hierarchy (e.g., any of 301-312). This may be used to enable operations such as updates, as these updates are propagated only to those tenants that make actual use of the deployment, and not to all tenants in the system.

The topology deployment system 110 may use hierarchical data structures (e.g., 300) representing network topology models, the associated metadata (e.g., 400A-400B) and/or the other data components described above, to perform various techniques for generating, storing, managing, and deploying formal network topology models. For example, new deployments may be generated and deployed within the workload resource domains 120, based on any of the elements within the hierarchy 300.

For instance, a request for a new deployment from a tenant or system administrator may identify element 312 in the hierarchy 300. The model inheritance engine 112 then may retrieve the portion of the network topology (or sub-model) associated with element 312, and traverse up the hierarchy 300 from element 312 to the root element 301. During the traversal from element 312, elements 305, 302, and 301 may be encountered and the portion of the network topology from each of these elements may be combined with the portion of the network topology from element 312. Differences or incompatibilities between the portions of the network topology may be resolved in favor of the element (or sub-model) closest to the element 312 selected for the new deployment, so that a first portion of a network topology from a lower-level element may be included in the combined topology while an associated portion from a higher-level element may be excluded. In addition to combining portions of the network topology, the model inheritance engine 112 also may retrieve and combine the constraints, preferences, and any other model characteristics associated with the element 312 branch of hierarchy 300, and the combined network topology and model characteristics may be transmitted to the model deployment engine 113 to be physically deployed within the workload resource domains 120.

In other examples, the topology deployment system 110 may use hierarchical data structures (e.g., 300) and associated metadata (e.g., 400A-400B) to access and modify particular models within the hierarchy 300. In some cases, model inheritance engine 112 may set the relationship metadata (e.g., weights, update frequency) for the affected element to assure that the modifications to the network topology do not propagate to other elements in the hierarchy 300. In other cases, the model inheritance engine 112 may set the relationship metadata so that all or a portion of the modifications to an element may propagate to other related elements in the hierarchy 300. Additionally, the model inheritance engine 112 may allow an administrator of the topology deployment system 110 to perform universal updates to all deployments associated with the hierarchy 300 using a single modification to the root element 301. For example, an administrator may access model data structure 208 via an interface of the topology deployment system 110 and update the root element 301. In response to an update to the root element 301, such as a change in the constraints or resource details, the model inheritance engine 112 may use the model inheritance relationships defined for the hierarchy 300 to automatically propagate the modification from the root element 301 to all other elements in the hierarchy 300.

Figure 5:
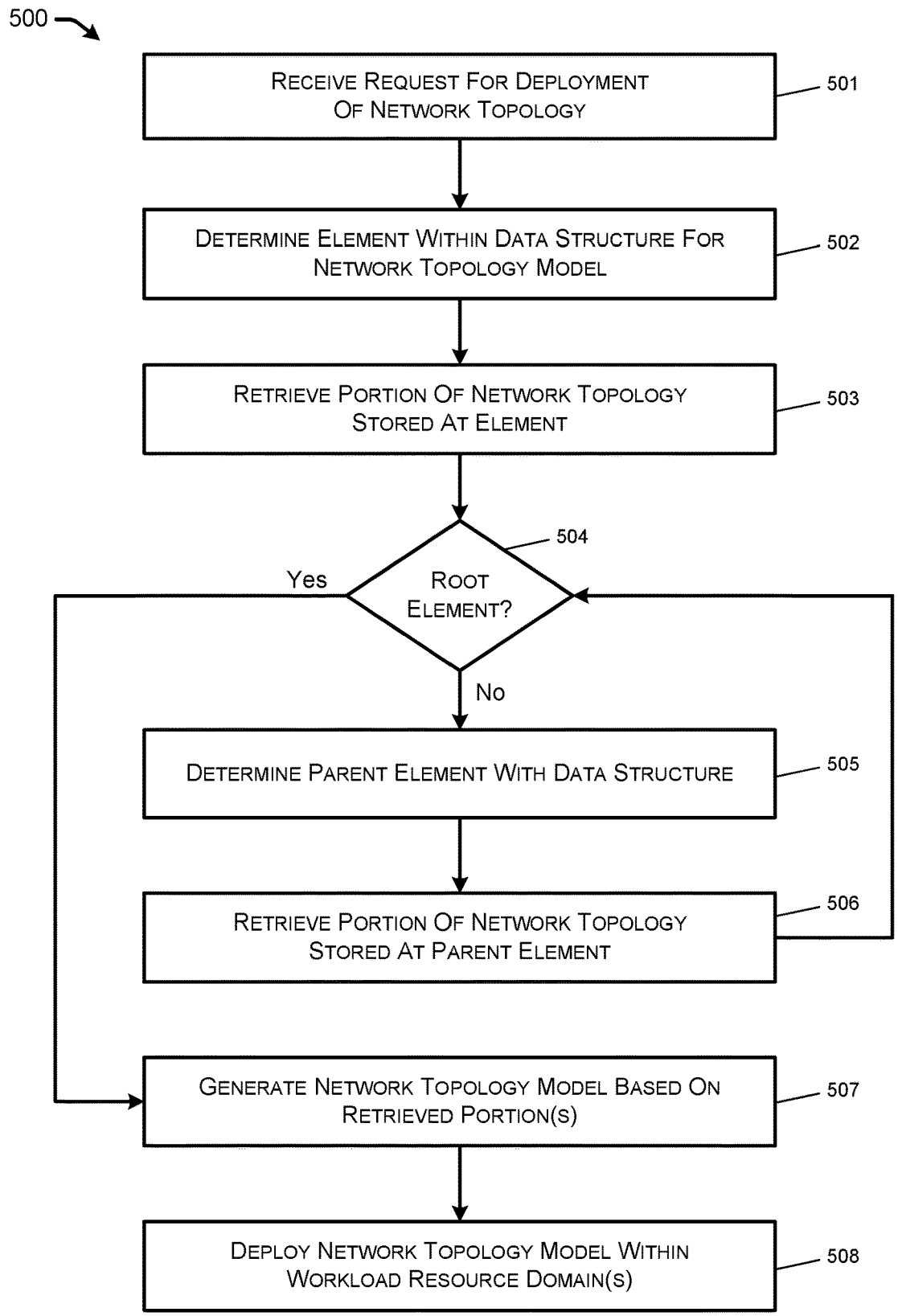
FIG. 5 illustrates a flow diagram of an example method of generating and deploying a network topology model based on related portions of network topologies retrieved from a data structure.

FIG. 5 illustrates a flow diagram of an example method 500 for generating and deploying a network topology model based on related portions of network topologies retrieved from a data structure. In some examples, method 500 may be performed by a system (e.g., topology deployment system 110) comprising one or more processors and one or more non-transitory computer-readable media storing computer-executable instructions that, when executed by the one or more processors, cause the one or more processors to perform method 500. For instance, a topology deployment system 110 including one or more of a model generation engine 111, model inheritance engine 112, and model deployment engine 113 may be used as described above to perform the operations of method 500.

At 501, the topology deployment system 110 may receive a request for a physical deployment of a network topology within the workload resource domains 120. The request may be a request to generate and deploy a new network topology based on an element within a model data structure (e.g., model hierarchy 300), or may be a request to modify an existing deployment operating within one or more workload resource domains 120. The topology deployment system 110 may receive the request from a tenant or system administrator via a user device 130. For example, an interface provided by the topology deployment system 110 may allow a user to select a particular network topology model for deployment and/or to select existing deployed topology to be modified.

At 502, the topology deployment system 110 may identify a particular element within a model data structure storing representations of network topology models, from which the network topology is to be generated and deployed. For example, within a hierarchical data structure such as the example hierarchy 300, the model inheritance engine 112 may determine the particular element with the hierarchy 300 representing the requested network topology model. In some cases, a particular hierarchy element may be received with the request at 501, while in other cases the model inheritance engine 112 may determine the appropriate element within the hierarchy 300 based on the model structure and characteristics received with the request.

At 503, the topology deployment system 110 may retrieve the portion(s) of the network topology stored at the element determined at 502. The portions of the network topology (or sub-model) associated with the element may be retrieved from the model data structure 208, or from a separate storage location in the data store 140 associated with the element in the hierarchy data structure). As discussed above, the network topology portion (or sub-model) represented by the element may include data identifying one or more nodes within the network topology model (e.g., node types, specifications, configurations, etc.), relationships between different nodes, constraints, metadata, and/or other model characteristics.

At 504-506, the topology deployment system 110 may traverse through the model data structure to identify related elements and retrieve the network topology portions stored at the related elements. For example, within the hierarchical data structure 300, if the base formal model for the requested deployment corresponds to element 308, the traversal at 504-506 may retrieve network topology portions associated with intermediary element 303 and root element 301. During the traversal, at 504, if the current element is not the root element (504:No), the model inheritance engine 112 may determine the parent of the current element at 505, and may retrieve the portion of the network topology stored at the parent element at 506.

At 507, when the traversal reaches the root element (504:Yes), the topology deployment system 110 may combine the portions of network topologies retrieved during the traversal. In some examples, if the portions of network topologies or incompatible in some respect (e.g., incompatible nodes or node arrangements, incompatible constraints, etc.), then the model inheritance engine 112 may ignore or overwrite the incompatible portions of the upper level elements, thereby resolving the incompatibilities in favor of the sub-model of the base element determined at 502 and the lower-level elements closest in the data structure to the base element. The output of the combined portions of network topology models retrieved during the traversal may be a complete representation of a formal network topology model corresponding to the base element determined or requested at 502.

At 508, the combined network topology model generated at 507 may be deployed within the one or more of the workload resource domains 120. The model deployment engine 113 may perform the physical deployment of the formal model using the techniques described herein. In various examples, the deployment performed at 508 may be a deployment of a new formal model, or may be a modification of an existing deployed model.

Figure 6:
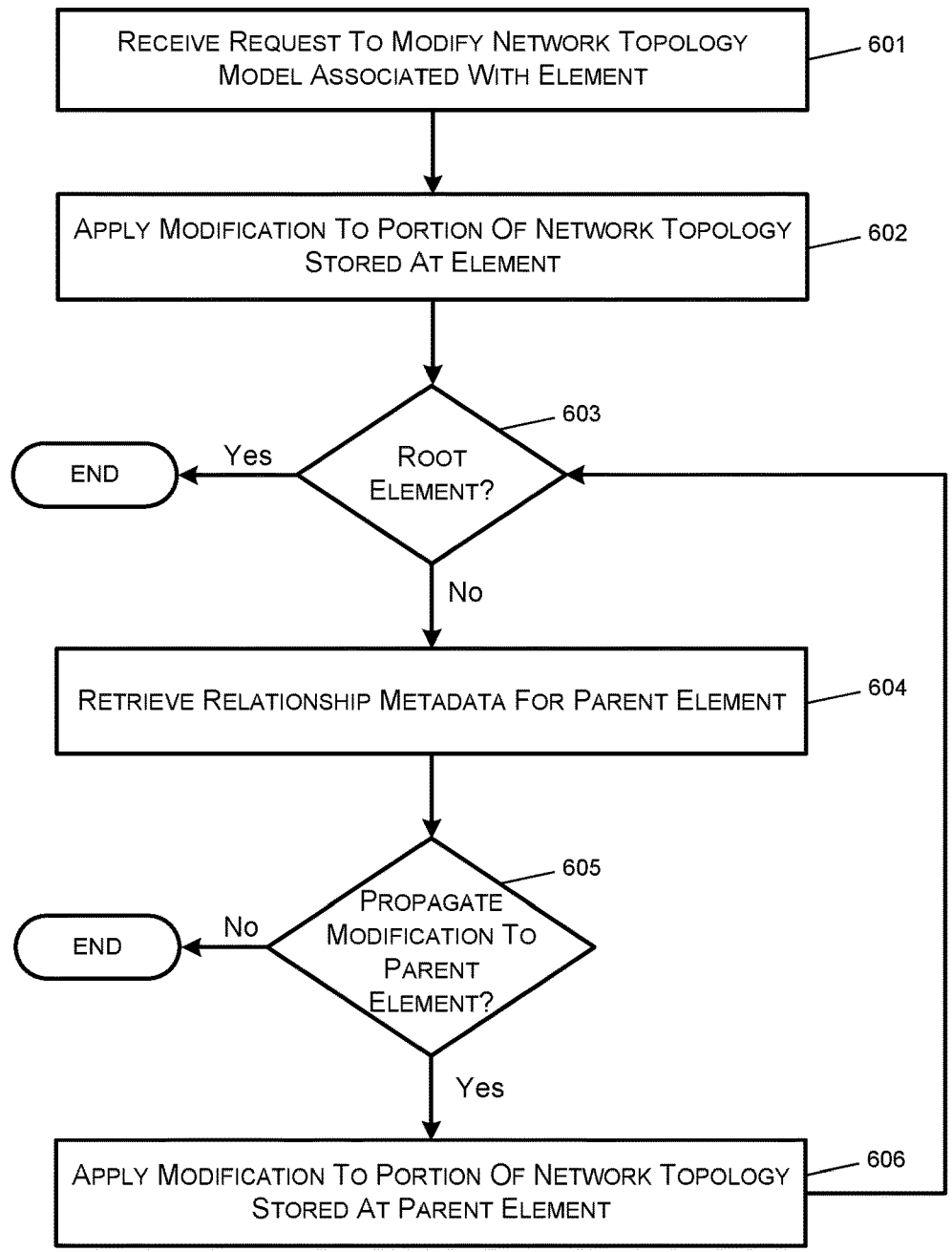
FIG. 6 illustrates a flow diagram of an example method of propagating modifications within a hierarchical data structure storing a network topology model, based on metadata associated with the element relationships in the hierarchical data structure.

FIG. 6 illustrates a flow diagram of an example method 600 for propagating modifications within a hierarchical data structure storing one or more network topology models, based on metadata associated with the element relationships in the hierarchical data structure. As discussed below, method 600 may be performed by a system (e.g., topology deployment system 110) comprising one or more processors and one or more non-transitory computer-readable media storing computer-executable instructions that, when executed by the one or more processors, cause the one or more processors to perform method 600. For instance, a topology deployment system 110 including one or more of a model generation engine 111, model inheritance engine 112, and model deployment engine 113 may be used as described above to perform the operations of method 600.

At 601, the topology deployment system 110 may receive a request to modify a network topology model represented by an element within a model data structure. In some examples, the request may be initiated based on a request to modify an existing network topology deployed within one or more workload resource domains 120. The model data structure, for example a hierarchical data structure 300, may store a number of elements representing one or more network topology models. The topology deployment system 110 may receive the request at 601 from a tenant or system administrator via a user device 130. An interface provided by the topology deployment system 110 (e.g., graphical user interface, software service, application programming interface, etc.) may allow a user to select a particular network topology model for modification.

At 602, the topology deployment system 110 may apply the requested modification to network topology model stored at the particular element within the model data structure associated with the request. The modification to be applied may include modifications to the portion of network topology associated with the element (e.g., adding or removing topology nodes, changing node arrangements or relationships), modifications to existing node characteristics or configurations, modifications to constraints, etc. To apply the modification at 602, the model inheritance engine 112 may identify and access the particular element within the hierarchical data structure 300, and then modify the sub-model stored at or associated with the particular element.

At 603-606, the topology deployment system 110 may traverse through the model data structure to identify related elements, and to determine whether or not to propagate the modification applied to the element at 602 to the related elements (e.g., parent elements) in the data structure. For example, within the hierarchical data structure 300, if the network topology model modified at 602 corresponds to element 309, the traversal at 603-606 may include intermediary element 304 and/or root element 301. During the traversal, at 603, if the current element is not the root element (603:No), then at 604 model inheritance engine 112 may retrieve metadata information for the relationship between the current element and its immediate parent element. If the current element in the hierarchical data structure 300 is element 309, then the model inheritance engine 112 may retrieve the metadata for the relationship between element 309 and its parent element 304. The model inheritance engine 112 also may retrieve the portion of the network topology stored at the parent element 304, and/or any constraints or model characteristics associated with the parent element 304.

At 605, the topology deployment system 110 may determine whether or not the modification should be propagated to and performed on the parent element. The determination at 605 may be based on the portion of the network topology stored at the parent element 304, the metadata stored by the system for the parent-child relationship, and/or other characteristics of the parent element. In some examples, the determination at 605 may be performed at a time based on the update frequency metadata for the parent-child relationship, and the propagation of the modification may be based at least in part the weight metadata for the parent-child relationship.

Figure 7:
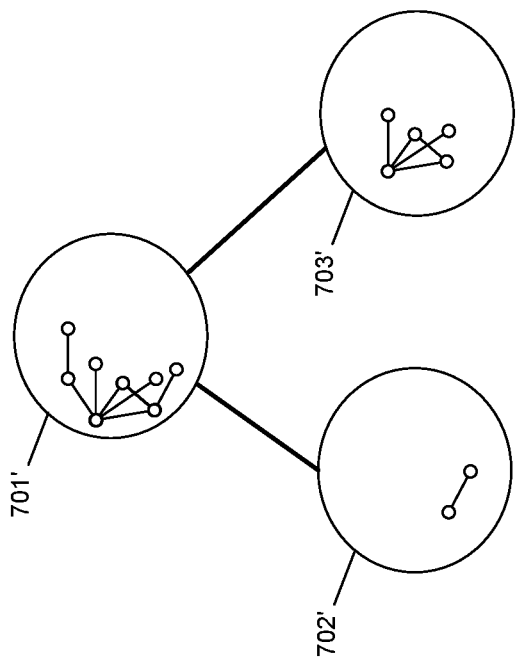
FIG. 7 is a graphical representation of a portion of a hierarchical data structure storing a network topology model, before and after a modification to the network topology model.
Figure 7:
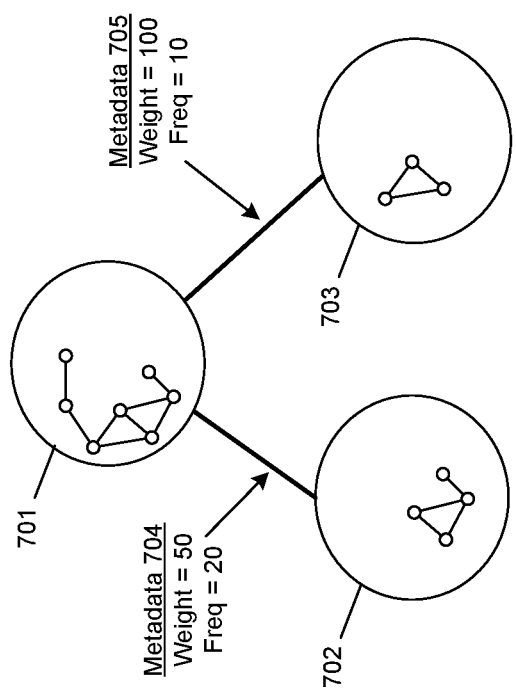

Referring briefly to FIG. 7, a graphical representation is shown of a portion of a hierarchical data structure storing a network topology model, before and after modifications to the network topology model. On the left side of FIG. 7, three elements of a model hierarchy data structure (701-703) are shown representing portions of a network topology before two modifications are performed on child elements 702 and 703. On the right side of FIG. 7, the same three elements of the hierarchy (701'-703') are shown after the modifications have been performed on child elements 702' and 703'. As shown in this example, modifications have been performed to the network topologies (e.g., sub-models) both of element 702 and element 703. For element 702, several of the topology nodes have been removed and are no longer present in the modified element 702'. For element 703, additional new topology nodes have been added and are shown in the modified element 703'. Using this example, the determination at 605 for if and how to update the parent element 701 may be based on the different portions of network topologies stored at the elements 701-703, as well as the respective metadata 704 and 705 defined for the parent-child relationships 701-702 and 701-703.

In this example, the modified network topologies 702' and 703' may be advertised to their immediate parent 701. The model inheritance engine 112 then may retrieve the metadata 704 for the parent-child relationship 701-702 (e.g., including a weight value of 50, update frequency of 20 seconds), and the metadata 705 for the parent-child relationship 701-703 (e.g., including a weight value of 100, update frequency of 10 seconds). When the modifications to child elements 702 are 703 are compatible, both modifications may be propagated up to the parent element 701. However, in the case of incompatible updates received from different child elements 702 and 703, the model inheritance engine 112 may identify the child element having the highest weight value for the child-parent relationship, and may prioritize the modifications for the highest weighted child element. Thus, in this example, the updates from child node 703 may override any incompatible updates from child node 702. For instance, because certain of the nodes that were removed from element 702' remain present in element 703', the updates to the parent element 701' may maintain these nodes and also may include the new nodes added in modified element 703'. The compatible portions of the modifications to element 702' also may be propagated to the parent element 701'. For instance, the nodes removed in modified element 702' that are not present in modified element 703', also may been removed from the parent element 701'. The model inheritance engine 112 may ignore and/or disregard any of the incompatible modifications from lower-weighted child elements.

Returning to FIG. 6, at 605 if the model inheritance engine 112 determines that at least some of the modifications are to be propagated to the parent element (605:Yes), then at 606 the model inheritance engine 112 applies the modifications to the parent element are continues the upward traversal of the hierarchy toward the root node. If the model inheritance engine 112 determines that no modifications are to be propagated to the parent element (605:No), then the traversal need not continue and the process may terminate.

After the completion of a process modifying one or more formal network topology models, such process 600 described above, the topology deployment system 110 then may modify the existing network topologies deployed within the workload resource domains 120. The modifications may be performed via the model deployment engine 113, to physically implement within the deployed network topologies the modifications made to the corresponding formal models. In some examples, the topology deployment system 110 may implement configuration options to allow a tenant and/or system administrator to determine when and how updates to a formal model may be implemented within the corresponding deployed topologies. For instance, a tenant and/or system administrator may configure the topology deployment system 110 to automatically deploy the updated models, conditionally deploy the updated models based on comparisons between predefined weight and update frequency thresholds and the weight and update thresholds associated with the updated models, based on service level agreement (SLA) information, or in response manual instructions provided by a tenant user and/or system administrator user.

As discussed in the above examples, the model inheritance engine 112 may design and generate model data structures (e.g., hierarchy 300) in which the root element 301 represents the most complete network topology model. However, in other examples, the model inheritance engine 112 may design and generate model data structures using an inverted concept for element/model inheritance, in which the root element data represents a relatively simple network topology that is common to every element in the hierarchy, and where the network topology portions become more complete and detailed the further they are positioned from the root node.

Figure 8:
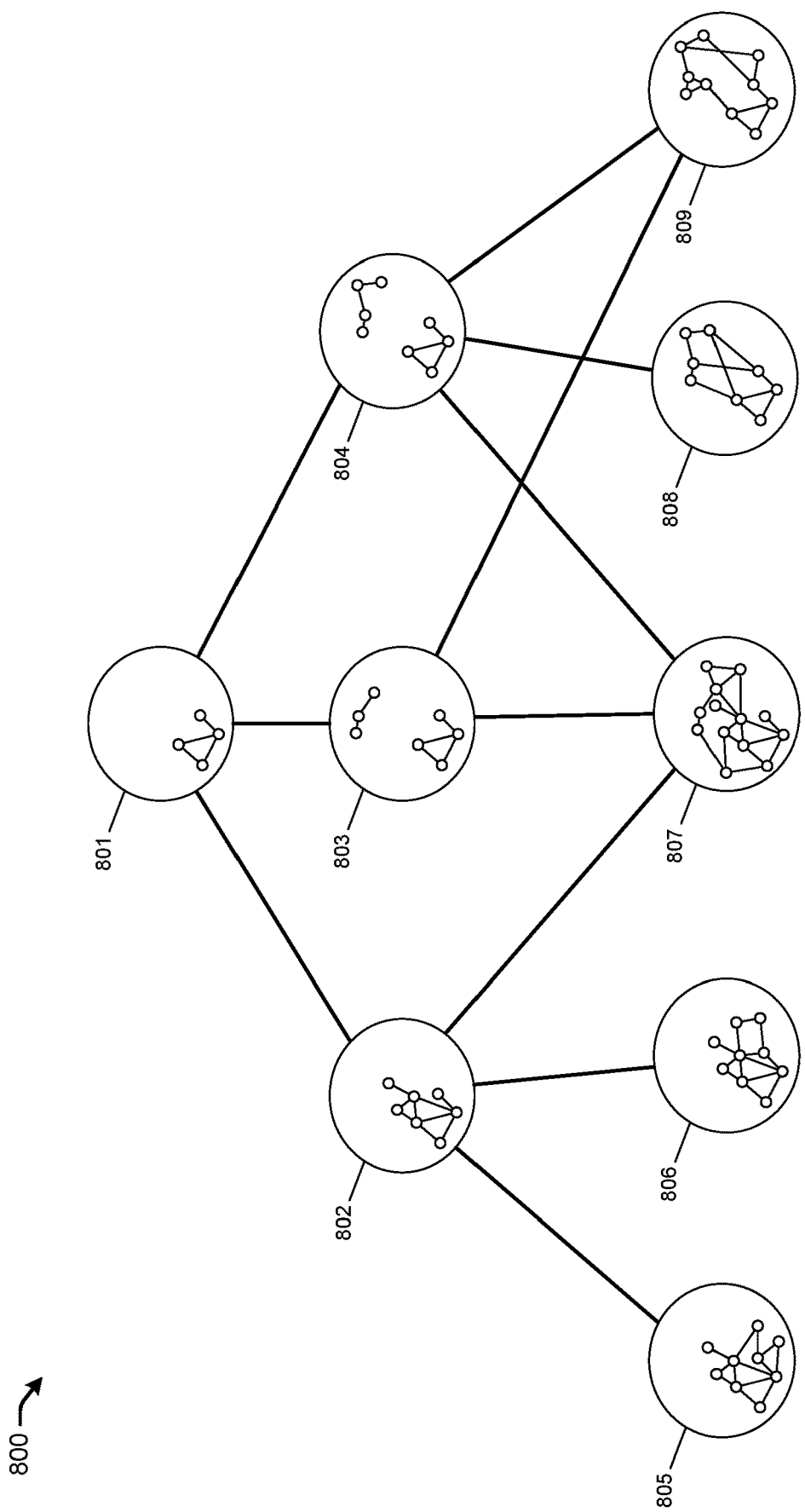
FIG. 8 is a graphical representation of another example hierarchical data structure storing related portions of a network topology within elements of the data structure.

Referring now to FIG. 8, a graphical representation is shown of another example hierarchical data structure 800, including a root element 801 storing a simplified network topology that may be common and inherited throughout the hierarchical data structure 800. The hierarchy 800 includes a level of intermediary elements 802-804, each of which inherits from and adds to the simplified topology of the root element 801. A second level of leaf elements 805-809 is also shown in the hierarchy 800, each of each inherits from and adds to the network topologies from at least one of the level-one intermediary elements 802-805. In contrast to the hierarchical data structure 300 described above, in this example hierarchy 800 is arranged so that each leaf element 805-809 stores a representation of a complete formal model that may be used for a tenant deployment. As discussed above for example hierarchy 300, it should be understood that hierarchy 800 is an illustrative example only, and that different numbers and arrangements of topology nodes and levels may be used in other examples of "inverted" model data structures such as hierarchy 800.

For inverted tree models, such as hierarchy 800, the model inheritance engine 112 may provide and support all previously defined operations. As shown in FIG. 8, inverted tree models also may provide same level cross-inheritance, in which a child element may inherit network topologies and/or other model data from parent elements as well as from other elements in the same level of the hierarchy 800. As an example, if a tenant owns multiple deployments, then updates to one deployment model may be inherited by all of the tenant deployments. By using an inverted tree model, the instead of traversing to the parent element to update the formal model (and potentially risking updating other tenants inheriting from the same parent), the tenant may link deployments together using the structure of the hierarchy to indicate that the linked deployments should inherit from each other on the same level of the hierarchy.

Figure 9:
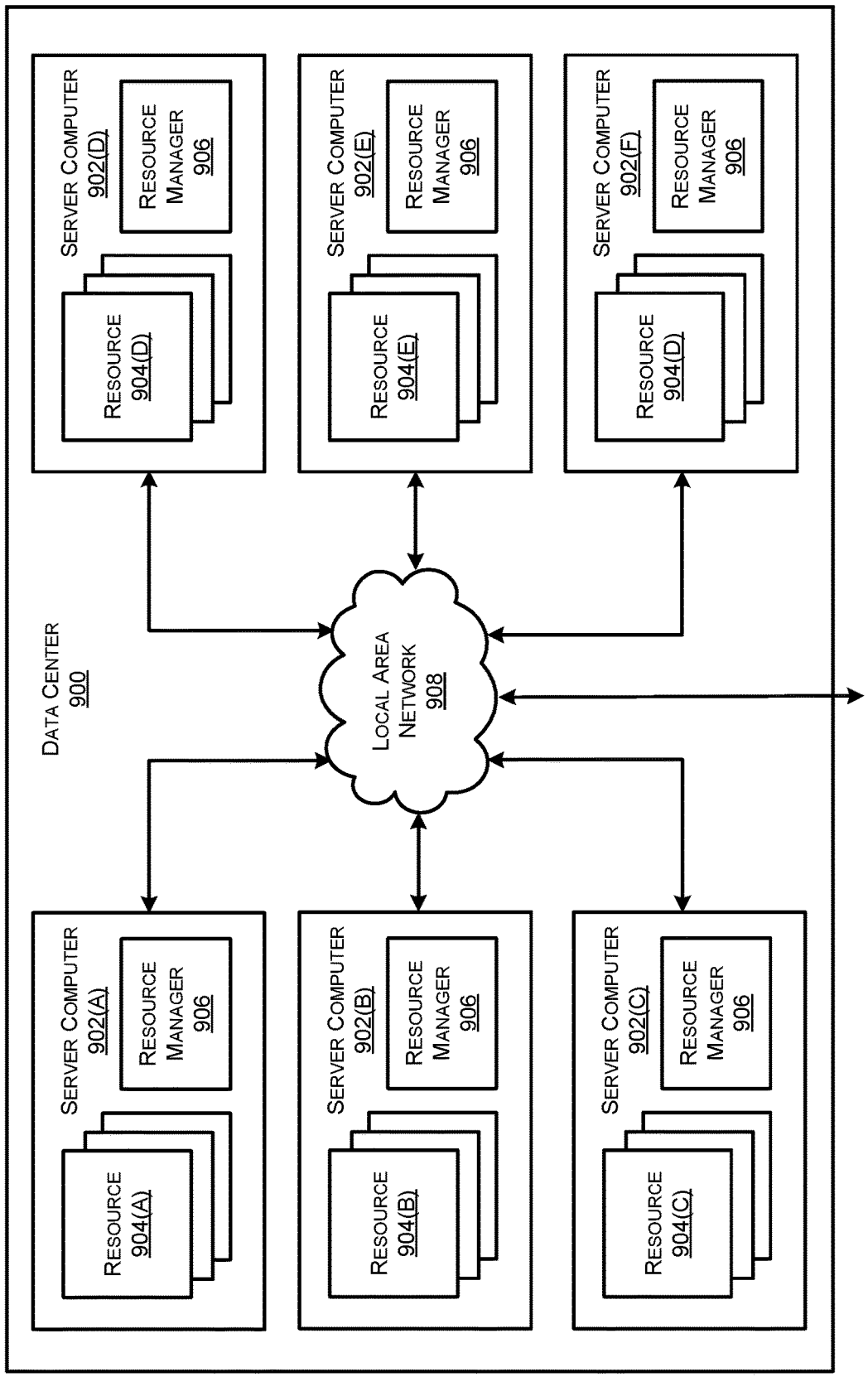
FIG. 9 illustrates a computing system diagram illustrating a configuration for a data center that can be utilized to implement aspects of the technologies disclosed herein.

FIG. 9 is a computing system diagram illustrating a configuration for a data center 900 that can be utilized to implement aspects of the technologies disclosed herein. The example data center 900 shown in FIG. 9 includes several server computers 902A-902F (which might be referred to herein singularly as "a server computer 902" or in the plural as "the server computers 902") for providing computing resources. In some examples, the resources and/or server computers 902 may include, or correspond to, any of the networks or devices described above in the computing environment 100. Although described as servers, the server computers 902 may comprise any type of networked device, such as servers, switches, routers, hubs, bridges, gateways, modems, repeaters, access points, etc.

The server computers 902 can be standard tower, rackmount, or blade server computers configured appropriately for providing computing resources. In some examples, the server computers 902 may provide computing resources 904 including data processing resources such as VM instances or hardware computing systems, database clusters, computing clusters, storage clusters, data storage resources, database resources, networking resources, and others. Some of the servers 902 can also be configured to execute a resource manager 906 capable of instantiating and/or managing the computing resources. In the case of VM instances, for example, the resource manager 906 can be a hypervisor or another type of program configured to enable the execution of multiple VM instances on a single server computer 902. Server computers 902 in the data center 900 can also be configured to provide network services and other types of services.

In the example data center 900 shown in FIG. 9, an appropriate LAN 908 is also utilized to interconnect the server computers 902A-902F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 900, between each of the server computers 902A-902F in each data center 900, and, potentially, between computing resources in each of the server computers 902. It should be appreciated that the configuration of the data center 900 described with reference to FIG. 9 is merely illustrative and that other implementations can be utilized. In some examples, the server computers 902 may each execute one or more application containers and/or virtual machines to perform techniques described herein.

In some instances, the data center 900 may provide computing resources, like application containers, VM instances, and storage, on a permanent or an as-needed basis. Among other types of functionality, the computing resources provided by a cloud computing network may be utilized to implement the various services and techniques described above. The computing resources 904 provided by the cloud computing network can include various types of computing resources, such as data processing resources like application containers and VM instances, data storage resources, networking resources, data communication resources, network services, and the like.

Each type of computing resource 904 provided by the cloud computing network can be general-purpose or can be available in a number of specific configurations. For example, data processing resources can be available as physical computers or VM instances in a number of different configurations. The VM instances can be configured to execute Applications, including web servers, application servers, media servers, database servers, some or all of the network services described above, and/or other types of programs. Data storage resources can include file storage devices, block storage devices, and the like. The cloud computing network can also be configured to provide other types of computing resources 904 not mentioned specifically herein.

The computing resources 904 provided by a cloud computing network may be enabled by one or more data centers 900 (which might be referred to herein singularly as "a data center 900" or in the plural as "the data centers 900"). The data centers 900 are facilities utilized to house and operate computer systems and associated components. The data centers 900 typically include redundant and backup power, communications, cooling, and security systems. The data centers 900 can also be located in geographically disparate locations.

Figure 10:
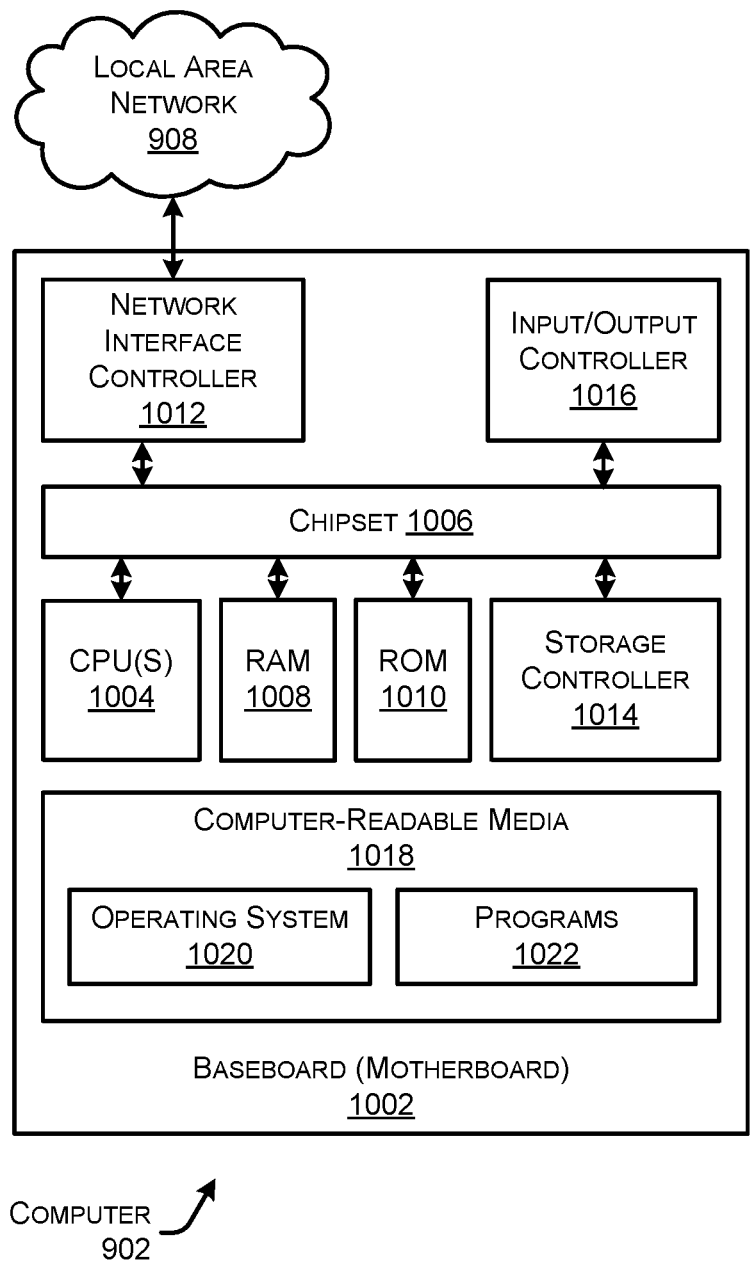
FIG. 10 is a computer architecture diagram showing an illustrative computer hardware architecture for implementing a server device that can be utilized to implement aspects of the various technologies presented herein.

FIG. 10 shows an example computer architecture for a server computer 902 capable of executing program components for implementing the functionality described above. The computer architecture shown in FIG. 10 illustrates a conventional server computer, workstation, desktop computer, laptop, tablet, network appliance, e-reader, smartphone, or other computing device, and can be utilized to execute any of the software components presented herein. The server computer 902 may, in some examples, correspond to a physical server as described herein, and may comprise networked devices such as servers, switches, routers, hubs, bridges, gateways, modems, repeaters, access points, etc.

The server computer 902 may correspond to any of the devices or systems described herein. In some examples, the server computer 902 may be configured to perform, potentially in conjunction with other server computers, the operations of the topology deployment system 110 and/or any of the engines or system components therein.

The computer 902 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 902.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 902. The chipset 1006 can further provide an interface to a computer-readable storage medium such as a read-only memory ("ROM") 1010 or non-volatile RAM ("NVRAM") for storing basic routines that help to startup the computer 902 and to transfer information between the various components and devices. The ROM 1010 or NVRAM can also store other software components necessary for the operation of the computer 902 in accordance with the configurations described herein.

The computer 902 can operate in a networked environment using logical connections to remote computing devices and computer systems through a network, such as the LAN 908. The chipset 1006 can include functionality for providing network connectivity through a NIC 1012, such as a gigabit Ethernet adapter. The NIC 1012 is capable of connecting the computer 902 to other computing devices over the LAN 908. It should be appreciated that multiple NICs 1012 can be present in the computer 902, connecting the computer to other types of networks and remote computer systems.

The computer 902 can be connected to a storage device 1018 that provides non-volatile storage for the computer. The storage device 1018 can store an operating system 1020, programs 1022, and data, which have been described in greater detail herein. The storage device 1018 can be connected to the computer 902 through a storage controller 1014 connected to the chipset 1006. The storage device 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 902 can store data on the storage device 1018 by transforming the physical state of the physical storage units to reflect the information being stored. The specific transformation of physical state can depend on various factors, in various examples. Examples of such factors can include, but are not limited to, the technology used to implement the physical storage units, whether the storage device 1018 is characterized as primary or secondary storage, and the like.

For example, the computer 902 can store information to the storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 902 can further read information from the storage device 1018 by detecting the physical states or characteristics of one or more particular locations within the physical storage units.

In addition to the mass storage device 1018 described above, the computer 902 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 902.

In some examples, the operations performed by the recommendation system 108, and or any components included therein, may be supported by one or more devices similar to computer 902. Stated otherwise, some or all of the operations performed by the topology deployment system 110, and or any components included therein, may be performed by one or more computer devices 902 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1018 can store an operating system 1020 utilized to control the operation of the computer 902. According to certain examples, the operating system comprises the LINUX operating system. According to other examples, the operating system comprises the WINDOWS® SERVER operating system from MICROSOFT Corporation of Redmond, Wash. According to further examples, the operating system can comprise the UNIX operating system or one of its variants. It should be appreciated that other operating systems can also be utilized. The storage device 1018 can store other system or application programs and data utilized by the computer 902.

In one example, the storage device 1018 or other computer-readable storage media is encoded with computer-executable instructions which, when loaded into the computer 902, transform the computer from a general-purpose computing system into a special-purpose computer capable of implementing the techniques and examples described herein. These computer-executable instructions transform the computer 902 by specifying how the CPUs 1004 transition between states, as described above. According to certain examples, the computer 902 has access to computer-readable storage media storing computer-executable instructions which, when executed by the computer 902, perform the various processes described above with regard to FIGS. 1-8. The computer 902 can also include computer-readable storage media having instructions stored thereupon for performing any of the other computer-implemented operations described herein.

The computer 902 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device. It will be appreciated that the computer 902 might not include all of the components shown in FIG. 10, can include other components that are not explicitly shown in FIG. 10, or might utilize an architecture completely different than that shown in FIG. 10.

As described herein, the computer 902 may comprise any of the network devices 106 described herein. The computer 902 may include one or more hardware processors 1004 (processors) configured to execute one or more stored instructions. The processor(s) 1004 may comprise one or more cores. Further, the computer 902 may include one or more network interfaces configured to provide communications between the computer 902 and other devices, such as the communications described herein as being performed by the topology deployment system 110, etc. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 1022 may comprise any type of programs or processes to perform the techniques described in this disclosure performed by the topology deployment system 110. For instance, the programs 1022 may cause the computer 902 to perform techniques for generating network topology models, generating and maintaining hierarchical structures representing model variations, and deploying network topology models within one or more workload resource domains 120.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more processors; and
one or more non-transitory computer-readable media storing computer-executable instructions that, when executed by the one or more processors, cause the one or more processors to:
receive a request to generate a network topology model associated with a workload resource domain;
determine a first element in a hierarchical data structure based on the request, wherein the first element is a non-root element of the hierarchical data structure;
retrieve a first network topology model portion stored at the first element in the hierarchical data structure;
traverse from the first element towards a root element in the hierarchical data structure, to determine a second element in the hierarchical data structure;
retrieve a second network topology model portion stored at the second element in the hierarchical data structure; and
generate the requested network topology model by combining and integrating at least the first network topology model portion and the second network topology model portion.

2. The system of claim 1, the computer-readable media storing further computer-executable instructions that, when executed by the one or more processors, cause the one or more processors to:
determine a set of deployment instructions based on the requested network topology model; and
transmit the set of deployment instructions to one or more nodes within the workload resource domain.

3. The system of claim 1, wherein the requested network topology model comprises a plurality of nodes, including at least one node in each of a plurality of workload resource domains.

4. The system of claim 1, wherein the hierarchical data structure comprises a root element at a root level and a plurality of additional elements arranged in one or more additional levels of the hierarchical data structure, and wherein the computer-readable media storing further computer-executable instructions that, when executed by the one or more processors, cause the one or more processors to:
traverse the hierarchical data structure from the first element to the root element, wherein the traversing comprises accessing a plurality of elements including the first element, the root element, and one or more intermediary elements including the second element; and retrieve separate network topology model portions from the first element, the root element, and each of the intermediary elements, wherein generating the requested network topology model comprises combining each of the separate network topology model portions into the requested network topology model.

5. The system of claim 4, wherein the requested network topology model comprises a plurality of nodes, and wherein generating the requested network topology model comprises:

determining that a first node represented in a network topology mode portion stored at one element of the hierarchical data structure, is incompatible with a second node represented in another network topology model portion stored at another element of the hierarchical data structure;

determining that the first element is closer to the one element than to the other element in the hierarchical data structure; and based on the determination that the first element is closer to the one element than to the other element in the hierarchical data structure, including the first node and excluding the second node in the network topology model.

6. The system of claim 1, wherein the computer-readable media storing further computer-executable instructions that, when executed by the one or more processors, cause the one or more processors to:

receive a request to apply a modification to the first network topology model portion;

apply the modification to the first network topology model portion stored in the first element of the hierarchical data structure;

determine that the second element is a parent element to the first element; and determine whether to apply the modification to the second network topology model portion, based at least in part on first metadata associated with a relationship between the first element and the second element in the hierarchical data structure.

7. The system of claim 6, wherein the second element is a parent element in the hierarchical data structure to the first element and to a third element, the third element storing a third network topology model portion, and wherein the determination of whether to apply the modification to the second network topology model portion is based on at least one of:

a comparison between a first set of nodes in the first network topology model portion, and a second set of nodes in the third network topology model portion; or a comparison between the first metadata associated with the relationship between the first element and the second element, and second metadata associated with the relationship between the third element and the second element.

8. The system of claim 1, wherein the hierarchical data structure comprises a root element and a plurality of additional elements arranged in one or more levels of the hierarchical data structure, and wherein each particular element of the plurality of additional elements stores a subset of the network topology model portion stored by a parent element of the particular element.

9. The system of claim 1, wherein the hierarchical data structure comprises root element and a plurality of additional elements arranged in one or more levels of the hierarchical data structure, and wherein each parent element in the hierarchical data structure stores network topology model portion common to each child element of the parent element.

10. A method comprising:

receiving, by a deployment computing system, a request to generate a network topology model associated with a workload resource domain;

determining, by the deployment computing system, a first element in a hierarchical data structure based on the request, wherein the first element is a non-root element of the hierarchical data structure;

retrieving, by the deployment computing system, a first network topology model portion stored at the first element in the hierarchical data structure;

traversing, from the first element towards a root element in the hierarchical data structure, to determine a second element in the hierarchical data structure;

retrieving, by the deployment computing system, a second network topology model portion stored by the second element in the hierarchical data structure; and generating, by the deployment computing system, the requested network topology model by combining and integrating at least the first network topology model portion and the second network topology model portion.

11. The method of claim 10, further comprising:

determining, by the deployment computing system, a set of deployment instructions based on the requested network topology model; and transmitting, by the deployment computing system, the set of deployment instructions to one or more nodes within the workload resource domain.

12. The method of claim 10, wherein the requested network topology model comprises a plurality of nodes, including at least one node in each of a plurality of workload resource domains.

13. The method of claim 10, wherein the hierarchical data structure comprises a root element at a root level and a plurality of additional elements arranged in one or more additional levels of the hierarchical data structure, and wherein the method further comprises:

traversing the hierarchical data structure from the first element to the root element, wherein the traversing comprises accessing a plurality of elements including the first element, the root element, and one or more intermediary elements including the second element; and retrieving separate network topology model portions from the first element, the root element, and each of the intermediary elements, wherein generating the requested network topology model comprises combining each of the separate network topology model portions into the requested network topology model.

14. The method of claim 13, wherein the requested network topology model comprises a plurality of nodes, and wherein generating the requested network topology model comprises:

determining that a first node represented in a network topology model portion stored at one element of the hierarchical data structure, is incompatible with a second node represented in another network topology model portion in stored at another element of the hierarchical data structure;

determining that the first element is closer to the one element than to the other element in the hierarchical data structure; and based on the determination that the first element is closer to the one element than to the other element in the hierarchical data structure, including the first node and excluding the second node in the network topology model.

15. The method of claim 10, wherein the method further comprises:

receiving a request to apply a modification to the first network topology model portion;

applying the modification to the first network topology model portion stored in the first element of the hierarchical data structure;

determining that the second element is a parent element to the first element; and determining whether to apply the modification to the second network topology model portion, based at least in part on first metadata associated with a relationship between the first element and the second element in the hierarchical data structure.

16. The method of claim 15, wherein the second element is a parent element in the hierarchical data structure to the first element and to a third element, the third element storing a third network topology model portion, and wherein the determination of whether to apply the modification to the second network topology model portion is based on at least one of:

a comparison between a first set of nodes in the first network topology model portion and a second set of nodes in the third network topology model portion; or a comparison between the first metadata associated with the relationship between the first element and the second element, and second metadata associated with the relationship between the third element and the second element.

17. A non-transitory computer-readable medium storing processor-executable instructions that, when executed by one or more processors, cause the one or more processors to perform operations comprising:

receiving a request to generate a network topology model associated with a workload resource domain;

determining a first element in a hierarchical data structure based on the request, wherein the first element is a non-root element of the hierarchical data structure;

retrieving a first network topology model portion stored at the first element in the hierarchical data structure;

traversing, from the first element towards a root element in the hierarchical data structure, to determine a second element in the hierarchical data structure;

retrieving a second network topology mode portion stored by the second element in the hierarchical data structure; and generating the requested network topology model by combining and integrating at least the first network topology model portion and the second network topology model portion.

18. The non-transitory computer-readable medium of claim 17, wherein the hierarchical data structure comprises a root element at a root level and a plurality of additional elements arranged in one or more additional levels of the hierarchical data structure, and wherein the method further comprises:

traversing the hierarchical data structure from the first element to the root element, wherein the traversing comprises accessing a plurality of elements including the first element, the root element, and one or more intermediary elements including the second element; and retrieving separate network topology model portions from the first element, the root element, and each of the intermediary elements, wherein generating the requested network topology model comprises combining each of the separate network topology model portions into the requested network topology model.

19. The non-transitory computer-readable medium of claim 18, wherein the requested network topology model comprises a plurality of nodes, and wherein generating the requested network topology model comprises:

determining that a first node represented in a network topology mode portion stored at one element of the hierarchical data structure, is incompatible with a second node represented in another network topology model portion stored at another element of the hierarchical data structure;

determining that the first element is closer to the one element than to the other element in the hierarchical data structure; and based on the determination that the first element is closer to the one element than to the other element in the hierarchical data structure, including the first node and excluding the second node in the network topology model.

20. The non-transitory computer-readable medium of claim 17, wherein the computer-readable medium stores further processor-executable instructions that, when executed by the one or more processors, cause the one or more processors to perform operations comprising:

receiving a request to apply a modification to the first network topology model portion;

applying the modification to the first network topology model portion stored in the first element of the hierarchical data structure;

determining that the second element is a parent element to the first element; and determining whether to apply the modification to the second network topology model portion, based at least in part on first metadata associated with a relationship between the first element and the second element in the hierarchical data structure.

* * * * *